United States Patent [19]

Tomisato et al.

[11] Patent Number: 5,504,783
[45] Date of Patent: Apr. 2, 1996

[54] FREQUENCY DIVERSITY TRANSMITTER AND RECEIVER

[75] Inventors: Shigeru Tomisato, Yokohama; Hiroshi Suzuki, Yokosuka, both of Japan

[73] Assignee: NTT Mobile Communication Network Inc., Tokyo, Japan

[21] Appl. No.: 154,411

[22] Filed: Nov. 19, 1993

[30] Foreign Application Priority Data

| Nov. 20, 1992 | [JP] | Japan | 4-312317 |
| Jun. 16, 1993 | [JP] | Japan | 5-145127 |
| Aug. 9, 1993 | [JP] | Japan | 5-197352 |

[51] Int. Cl.⁶ .................................. H04B 7/02
[52] U.S. Cl. .................. 375/267; 375/347; 455/101; 370/121; 371/37.1
[58] Field of Search .................. 375/1, 96, 38, 375/39, 40, 100, 59, 13, 14, 202; 455/101, 103, 59; 370/121, 93, 69.1, 19; 371/37.1; 395/2.13

[56] References Cited

U.S. PATENT DOCUMENTS

| 4,621,355 | 11/1986 | Hirosaki et al. | 370/19 |
| 4,686,688 | 8/1987 | Chung et al. | 375/47 |
| 4,881,241 | 11/1989 | Pommier et al. | 375/38 |
| 5,103,459 | 4/1992 | Gilhousen et al. | 370/22 |
| 5,170,413 | 12/1992 | Hess et al. | 370/69.1 |
| 5,278,844 | 1/1994 | Murphy et al. | 375/53 |

OTHER PUBLICATIONS

"Digital Communications Fundamentals and Applications" Bernard Sklar, pp. 555–562, 1988.
"Digital Communications and Spread Spectrum System" Liemer et al, pp. 348–355, 1985.

Primary Examiner—Stephen Chin
Assistant Examiner—T. Ghebretinsae
Attorney, Agent, or Firm—Cushman, Darby & Cushman

[57] ABSTRACT

A frequency diversity communication system is provided whereby the number of hopping channels is reduced and a more continuous communication achieved as a mobile station travels from cell to cell by the combination of chips of symbols from the mobile sources. The transmitter divides each symbol of an input symbol sequence into a number K of chips, which are modulated with mutually different carrier frequencies. The receiver demodulates the signal sent by the transmitter by local frequencies corresponding respectively to the K different carrier frequencies. According to this invention, the carrier phase is coherent for each frequency of the received wave. Moreover, because the carrier phase is coherent, the outputs for each frequency of the received wave can be combined with the use of a training signal. The receiver also performs an estimation of the maximum likelihood of the transmitted symbol to eliminate the need for decoding. It is also provided that the order of the chips of the symbols is rearranged within a burst.

31 Claims, 28 Drawing Sheets

5,504,783

FREQUENCY DIVERSITY TRANSMITTER AND RECEIVER

FIELD OF THE INVENTION

This invention relates to mobile radio communication. More particularly it relates to frequency diversity of the signal to combat fading fluctuation.

BACKGROUND OF THE INVENTION

Diversity techniques have been used for some time in mobile and other radio communications to combat fading fluctuation. Well-known diversity techniques include space diversity and frequency diversity, and known techniques for obtaining a frequency diversity effect include multi-carrier and frequency hopping (FH). Frequency hopping includes fast frequency hopping (FFH), where hopping is carried out one or more times per data symbol, and slow frequency hopping (SFH), where the frequency is hopped for each burst formed on the basis of a signal comprising two or more data symbols. Fast frequency hopping in particular can give an extremely stable transmission path since a frequency diversity effect is obtained for each symbol.

FIG. 34 is a block diagram showing an example of a conventional frequency diversity transmitter and receiver using fast frequency hopping.

This conventional system has both a transmitter and a receiver. The transmitter is provided with a quadrature modulator 201, a frequency synthesizer 202, a frequency controller 203 and a bandpass filter 204. The quadrature modulator 201 modulates the input symbol sequence with carrier frequencies generated by the frequency synthesizer 202. The frequencies generated by the frequency synthesizer 202 are controlled by the frequency controller 203, with K different frequencies being generated in a prescribed order during the interval of one symbol of the input symbol sequence, where K is an integer equal to or greater than 2.

The output of the quadrature modulator 201 passes through the bandpass filter 204 and is transmitted from an antenna. The modulated signal thus transmitted is a signal wherein each symbol comprises K chips. It will be assumed here that K=4.

The receiver is then provided with K=4 systems each comprising a mixer 205, a local oscillator 206, a bandpass filter 207 and a square-law detector 208. It is also provided with a combiner 209 which combines the signals from the four systems. The signal received by the antenna is distributed to the four mixers 205. Local frequencies from the local oscillators 206 are respectively supplied to these four mixers 205. The outputs of the mixers 205 are input to bandpass filters 207, and the chip signals are extracted from the fast frequency-hopped signal. Square-law detection of these extracted chip signals is carried out by square-law detectors 208 for level recovery. The combiner 209 outputs the level sum of the chips over each symbol.

Demodulation systems in fast frequency hopping may have either coherent detection or non-coherent detection. Because non-coherent detection does not look at the carrier phase of the chips, the transmission characteristics are inferior to those obtained with coherent detection, where the phase of the carrier is included in the detection process. In the case of binary phase-shift keying (BPSK), for example, it is known that to obtain the same error rate, the carrier-to-noise ratio (CNR) of non-coherent detection will be 6 dB worse than that of coherent detection. However, in a practical mobile radio communication, carrier synchronization is difficult to achieve due to the rapidity of the fading fluctuation in the transmission path, and so the aforementioned non-coherent detection method has been conventionally employed.

In the multi-carrier technique, which is another method for obtaining a frequency diversity effect, one and the same symbol is modulated with different carrier frequencies. Diversity transmission can be achieved if these are converted to the baseband at the receiver side and optimally combined, since the carriers will not all be at a low level simultaneously in a frequency selective fading channel. With this method, however, since the same signal is transmitted using a plurality of carriers, the modulation bandwidth shows an equivalent increase and so the frequency spectrum is not efficiently used.

SUMMARY OF THE INVENTION

A frequency diversity transmitter and receiver according to this invention can be utilized for cellular mobile radio communications. In cellular systems, which are widely used in mobile radio communications, if the same frequency is used in two adjacent cells, interference from the adjacent station increases when a mobile station enters the periphery of the cell. Under such circumstances, transmission proceeds by synchronizing the symbol timing at the two base stations and ensuring that the hopping phase (the phase of the frequency change) is different. The temporal broadening of the channel impulse response to the signal which the mobile station receives will then exceed the chip width, and so the two received chip signals can be easily combined if interference within a given station is reduced by decreasing the number of hopping channels. Moreover, a completely continuous communication can be maintained when cell changeover takes place accompanying the movement of a mobile station. In the case of multicarrier, signals transmitted from a given station with different things will be delayed and will therefore overlap, and so if equalization is carried out at the same time as the combining, the intersymbol interference due to this delay can be removed, and exactly the same effect as hopping can be achieved. Although the foregoing concerns transmission from base stations to mobile stations, the fact that there is a plurality of mobile stations means that the same holds true for transmission from mobile stations to base stations.

Furthermore, when a mobile station enters the periphery of a cell in a cellular system, the reception characteristics will deteriorate if another station is present which is using the same code and the same frequency as the first mobile station. If linear demodulation is employed, interference is cancelled because other users' signals are orthogonal to the mobile station in question, but cancellation will become unsatisfactory when the codes are the same. Accordingly, when this invention is utilized in cellular communications, interference can be decreased (for example, when a mobile station enters the perimeter of a cell) by ensuring that channels which employ the same code and the same frequency as the mobile station are not used by other adjacent stations. In addition, by ensuring that the mobile station uses transmitting and receiving channels which use the same code and the same frequency as an adjacent station, the receiving power can be increased and a completely continuous communication can be maintained during handoff.

A frequency diversity transmitter and receiver is provided where the transmitter sends each symbol of the input symbol sequence after dividing it into a plural number K of chips and modulating these chips with mutually different carrier frequencies, and where the receiver receives the signal sent by this transmitter and demodulates it by local frequencies corresponding respectively to the K different carrier frequencies. There is provided a carrier frequency generator which generates, as the carrier frequencies for these K chips, K types of signals with a preset initial phase; and a local frequency generator which generates, as a local frequency for each carrier frequency, a signal which is substantially in phase with the initial phase of the carrier.

The carrier frequency generator and the local frequency generator may each include a look-up table in which a periodic waveform has been pre-recorded, and sets the output frequency by changing the addresses specified in this look-up table.

The carrier phase according to this invention is coherent for each frequency of the received wave, and excellent transmission characteristics are obtained. According to this invention, a CNR giving the same error rate will theoretically be 6 dB better than the conventional, non-coherent detection method. Since this invention provides that several user signals can be multiplexed by codes, it also provides for an improved efficiency of frequency utilization.

Moreover, because the carrier phase is coherent, the detection outputs for each frequency of the received wave can be combined by a combining method established by a training signal. It is convenient to combine the complex envelope of each chip into a single envelope by least squares fitting. Each complex envelope may be multiplied by a complex coefficient (equivalent to a weighting coefficient) and these complex coefficients may be adaptively changed in accordance with the received signal. By adaptively changing the complex coefficients by the received signal, coherent detection can be maintained despite fading and jamming. When these complex coefficients are to be adaptively changed, it is convenient to send a training signal with a predetermined signal pattern from the transmitter, and to set the initial value of the complex coefficients from the decision error made when this training signal is received. Processing of this sort, for signals which are transmitted after data symbols have been divided into chips, is novel.

Because the carrier phase is coherent for each chip, the chips for one symbol can be encoded, transmitted, and then decoded at the receiver side. In a conventional, non-coherent detection method, although chips can be encoded, it has been impossible to decode them at the receiver side.

If chips are coded, a plurality of symbol sequences can be transmitted simultaneously at the same frequency, with the result being effective use of frequency. An estimation of the maximum likelihood at the receiver side is performed. In this case, symbol candidates are obtained at the receiver side. An equivalent coding to that used at the transmitter side is then applied to these symbol candidates, and estimates of the complex envelope signals are then obtained from these coded candidates and comparisons are made between these estimates and the received complex envelope signals. When this processing is employed, no decoding is required at the receiver side.

This coding of chips can be utilized in frequency-hopped frequency diversity systems in which the carrier frequency for each symbol changes in a time series manner. It can also be applied in multi-carrier type frequency diversity systems in which one and the same symbol is transmitted simultaneously at a plurality of carrier frequencies. In this latter case, although signals obtained from one and the same symbol are transmitted at mutually different frequencies, because these signals (i.e., chips) are coded, this does not mean that one and the same signal is transmitted at a plurality of frequencies as in the conventional multi-carrier frequency diversity method.

It is also provided that the order of the chips obtained by splitting each symbol of the symbol sequence is arranged within a burst. In particular, if all chips using the same carrier frequency are grouped together, the frequency changeover rate in the frequency hopping can be decreased, making the hardware implementation easier.

It is also provided that each set of grouped chips may be transmitted in parallel at the different carrier frequencies. Since in this case it is not complete symbols but rather the chips resulting from their division that are transmitted in parallel, occupancy time is short, and so effective frequency utilization can be achieved. If the chips are encoded, then even though chips have been obtained from the same symbol, their logical value will be different, and so the effects of disturbance can be mitigated and transmission quality can be improved.

When the channel impulse response of an interfering signal from another channel is estimated by means of a training signal contained in the interfering signal, the timing of the desired signal and the interfering signal may not coincide. Under such circumstances, the channel impulse response estimate for individual symbols may be changed according to their chip positions.

It is also provided that the channel impulse response estimates respectively obtained from the interfering signals may be combined.

Error-correcting code techniques may be applied to the symbol sequences. This involves forming blocks containing a predetermined number of data symbols. The code sequences thereby obtained can then be converted to chip sequences and transmitted using different frequencies.

Therefore, an object of this invention is to provide a frequency diversity transmitter and receiver which overcome such problems and which have excellent transmission characteristics for mobile radio communication.

Embodiments of this invention will now be explained in detail with reference to the accompanying drawings.

DESCRIPTION OF THE PREFERRED EMBODIMENTS

Figure 1:
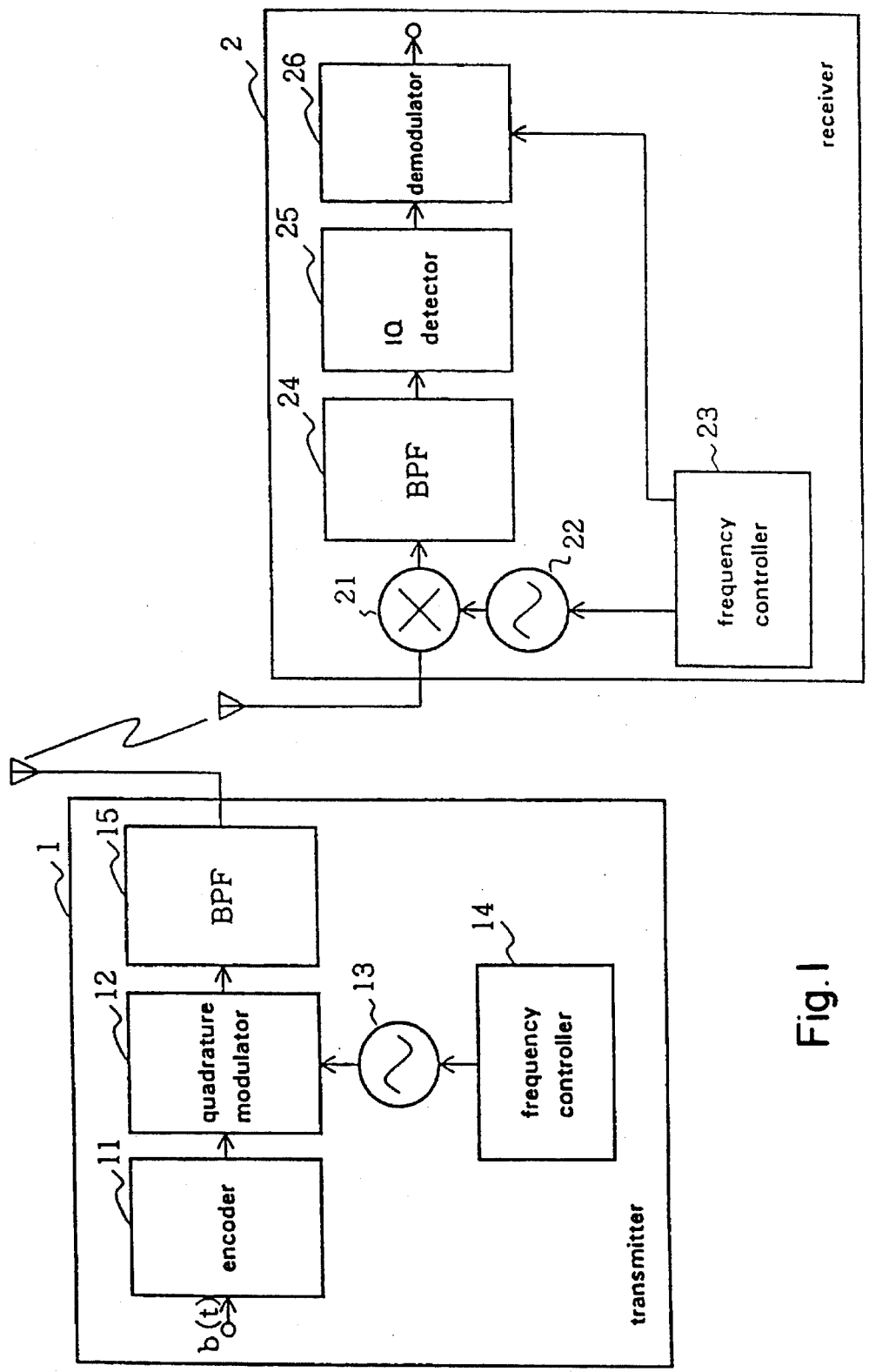
FIG. 1 is a block diagram showing a frequency diversity transmitter and receiver according to a first embodiment of this invention.

FIG. 1 shows a block diagram of a frequency diversity transmitter and receiver according to a first embodiment of this invention. In this embodiment, a frequency diversity effect is obtained by frequency hopping.

A system according to this embodiment is provided with transmitter 1, which transmits each symbol of the input symbol sequence after modulating it with K carrier frequencies (where K is an integer equal to or greater than 2), and receiver 2 which receives the transmitted signal from this transmitter and demodulates it with K types of local frequency, which are respectively synchronized with the K types of carrier frequencies. The transmitter 1 is provided with an encoder 11, a quadrature modulator 12, a frequency synthesizer 13, a frequency controller 14, and a bandpass filter 15. The receiver 2 is provided with a mixer 21, a frequency synthesizer 22, a frequency controller 23, a bandpass filter 24, an IQ detector 25, and a demodulator 26. The symbol rate is 1/T. The signals in the following discussions are expressed by complex-numbers such as $S(t)=Re[S(t)]$ where $Re[\ ]$ denotes the real part of the bracketed complex-number signal notations.

The symbol sequence $b(t)$ that is input to the input terminal of the transmitter 1 can be represented by:

$$b(t)=b_i(t)+jb_q(t) \qquad (1)$$

which is input to the encoder 11. The encoder 11 divides this symbol sequence $b(t)$ into K coded chips, thereby forming a coded chip signal. Orthogonal functions such as Walsh functions are used for the coding. The coded chip signal is input to the quadrature modulator 12. In the quadrature modulator 12, a carrier signal $c_i(t)$ that has been output from the frequency synthesizer 13 is used as the local carrier, and the chip modulated wave $S(t)$ is formed. $c_i(t)$ can be written as:

$$c_i(t)=\exp[j\omega(t)t+\Phi(t)] \qquad (2)$$

where:

$$\omega(t)=\omega_k,\ iT+(k-1)T/K \leq t < iT+kT/K \qquad (3a)$$

$$\Phi(t)=\Phi_k,\ iT+(k-1)T/K \leq t < iT+kT/K \qquad (3b)$$

and where i is an integer representing time with unit T, $\omega_k$ is the frequency, and $\Phi_k$ the initial phase of the carrier signal for the $k^{th}$ chip ($1 \leq k \leq K$). The frequency of the carrier signal $c_i(t)$ is changed over in accordance with control signals that are output from the frequency controller 14. The chip modulated wave $S(t)$ is therefore:

$$S(t)=b(t)c_i(t) \qquad (4)$$

The carrier signal frequency $\omega_k$ changes for each chip in a predetermined order. Assuming that its value is distributed across the entire system bandwidth $W_R$ and that $\omega_k \neq \omega_{k'}$, for $k \neq k'$, a diversity effect will be obtained by ensuring that the frequencies are separated as much as possible. In particular, a large diversity effect with respect to random fading can be anticipated if the frequencies are arranged evenly across the system bandwidth $W_R$. However, in circumstances where fading does not fluctuate, distributing these frequencies non-uniformly (for example, placing $\omega_k$ in selected bands where there is no drop in signal level) is an alternative that can be expected to give a large improvement in transmission characteristics. The phase of each hopping frequency is preserved, and the frequency controller 14 performs phase control as well.

A transmission channel where, as outlined above, one symbol is formed from K chips obtained by hopping K times, will hereinafter be called a "hopping channel." Assuming that the chip bandwidth is such that $N_c$ chips will fit inside the system bandwidth $W_R$, the number of hopping channels $N_H$ will be $N_c$. A plurality of users can be multiplexed in each hopping channel.

Figure 2:
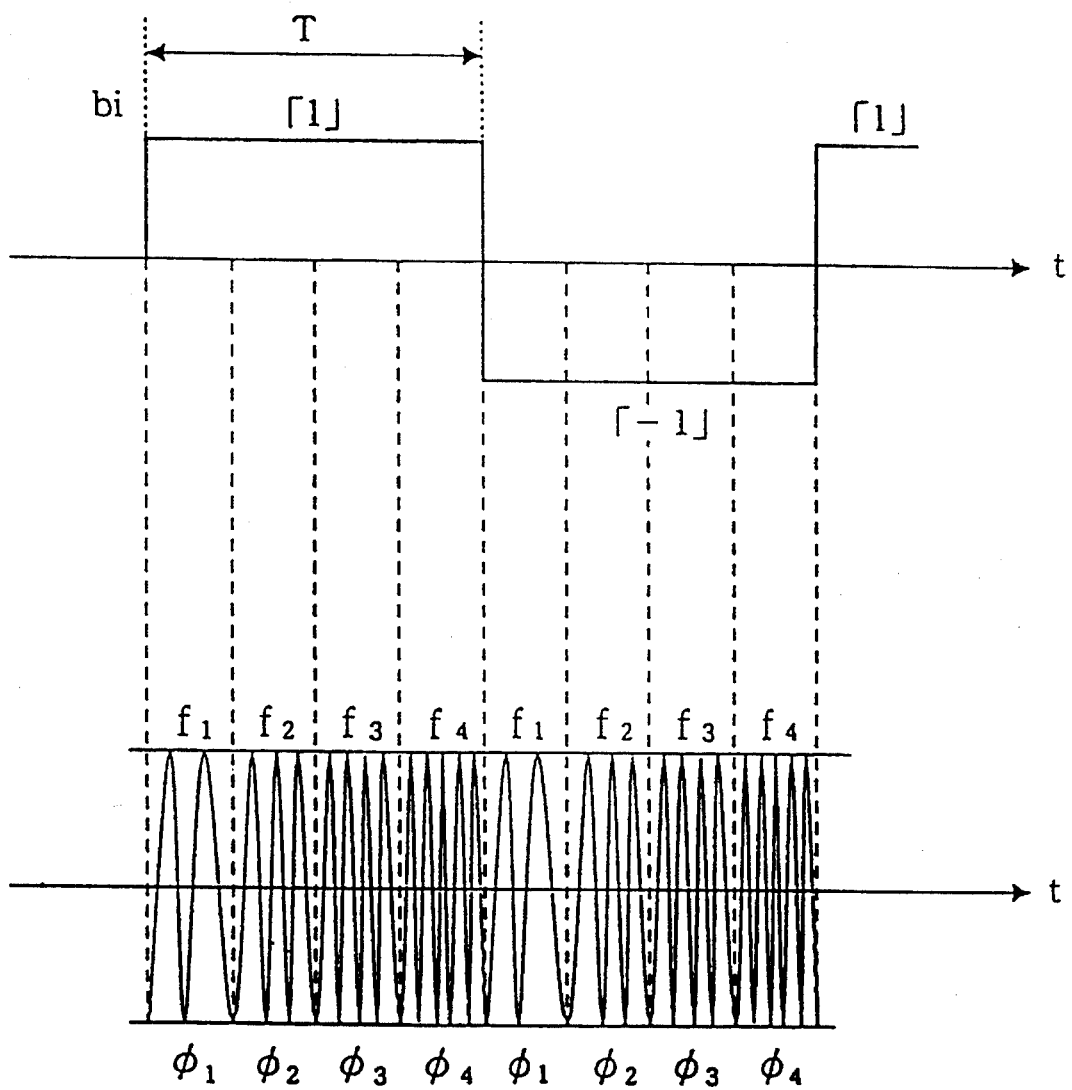
FIG. 2 explains the modulation method and shows an example of a chip-modulated waveform.

FIG. 2 illustrates the aforementioned modulation method having a chip number K=4. In the example shown here, symbol $b_i$ changes from "1" to "−1" and back to "1" each change occurring after an interval of T. Each of these symbols is divided into four chips. In order to simplify the explanation, it will be assumed that the coding is carried out using orthogonal Walsh functions.

Next, modulation is performed by respectively assigning carrier signals with frequency and initial phase $f_1$ and $\Phi_1, f_2$ and $\Phi_2, f_3$ and $\Phi_3, f_4$ and $\Phi_4$ to each chip, and a chip modulated wave is obtained. By repeating this operation for each symbol, a fast frequency-hopped transmission wave is generated.

Figure 3:
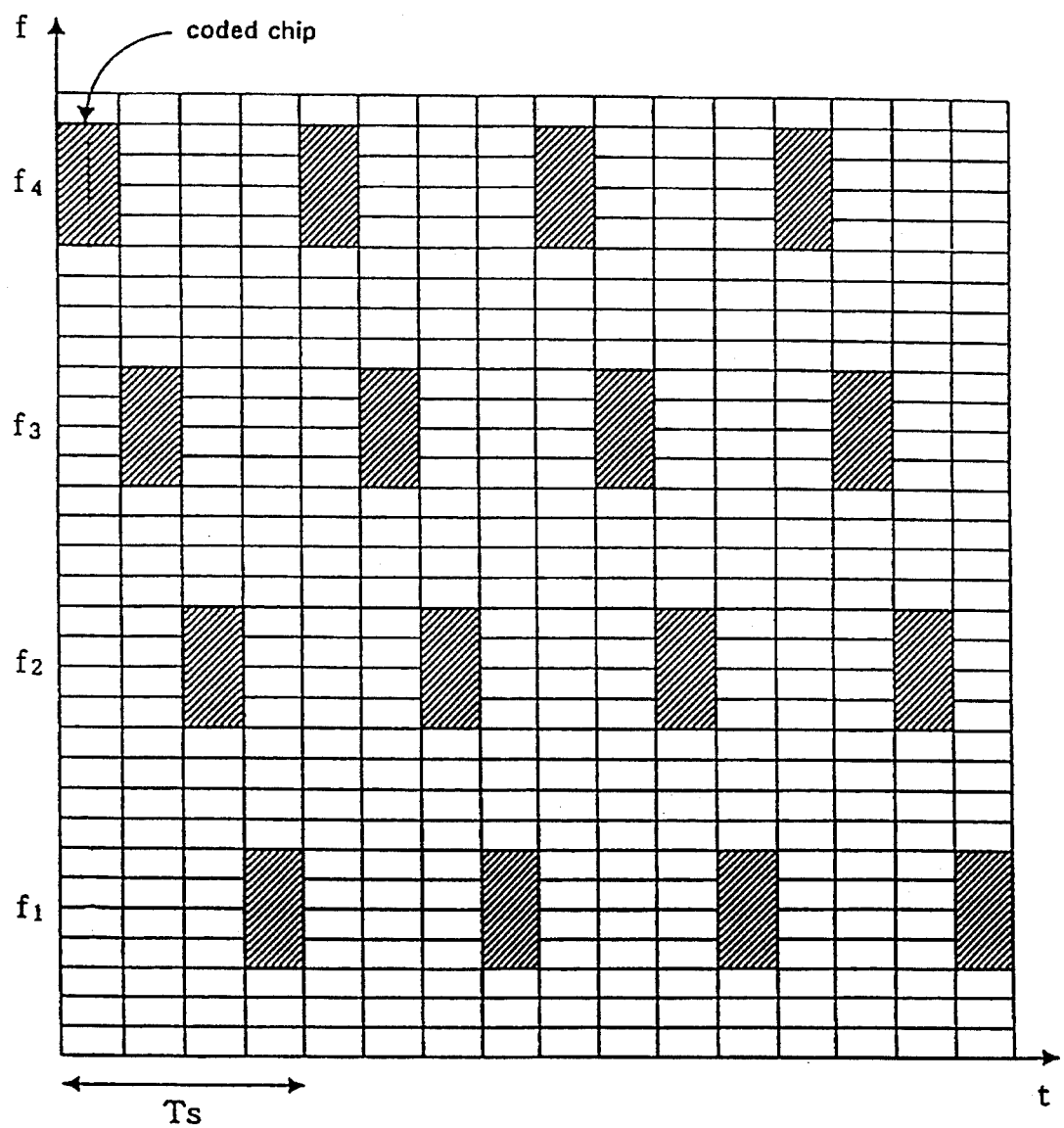
FIG. 3 shows the transmitted signal on the time-frequency domain.

FIG. 3 shows the signal in the time-frequency domain.

The explanation will now refer again to FIG. 1. The wave received by the receiver can be expressed using A(t), the value of the complex envelope fluctuation due to fading in the transmission path, and N(t), the thermal noise, in which case it is given by:

$$r_x(t)=A(t)S(t)+N(t) \qquad (5)$$

where:

$$A(t)=A_k(t), \quad iT+(k-1)T/K \leq t < iT+kT/K \qquad (6a)$$

$$A_k(t)=|A_k(t)|\exp\{jArg|A_k(t)|\} \qquad (6b)$$

$A_K(t)$ is the complex amplitude of the k-th chip received. The received wave is input to the mixer 21 where it is dehopped by the output $c_r(t)$ of the frequency synthesizer 22. Using the carrier signal $c_t(t)$ in the transmitter, $c_r(t)$ can be expressed as:

$$c_r(t)=c_t(t)\exp[j\Phi_o(t)] \qquad (7)$$

where $\Phi_0(t)$ is the phase difference between the transmitter side frequency synthesizer 13 and the receiver side frequency synthesizer 22, but it will be assumed here that the initial phase of the frequency synthesizers 13 and 22 are perfectly controlled, and so:

$$\Phi_o(t)=\Phi_o \qquad (8)$$

The frequencies of the receiver side frequency synthesizer 22 are changed over synchronously with the transmitter side hopping pattern by control signals from the frequency controller 23. The output of the mixer 21 passes through the bandpass filter 24 and is quasi-coherently detected by the IQ detector 25. The quasi-coherently detected complex envelope signal r(t) can be represented by:

$$\begin{aligned} r(t) &= r_x(t)c^*_r(t) \\ &= A(T)S(T)c^*_r(t) + N(t)c^*_r(t) \\ &= S_r(t) + N_r(t) \end{aligned} \qquad (9)$$

where:

$$S_r(t)=A(t)b(t)\exp(-j\Phi_o) \qquad (10)$$

Channel recognition is carried out in the demodulator 26 using the training signal in this complex envelope signal r(t), and demodulation is performed by deciding the symbols on the basis of this result. Specific examples of demodulation will be described herein later.

Figure 4:
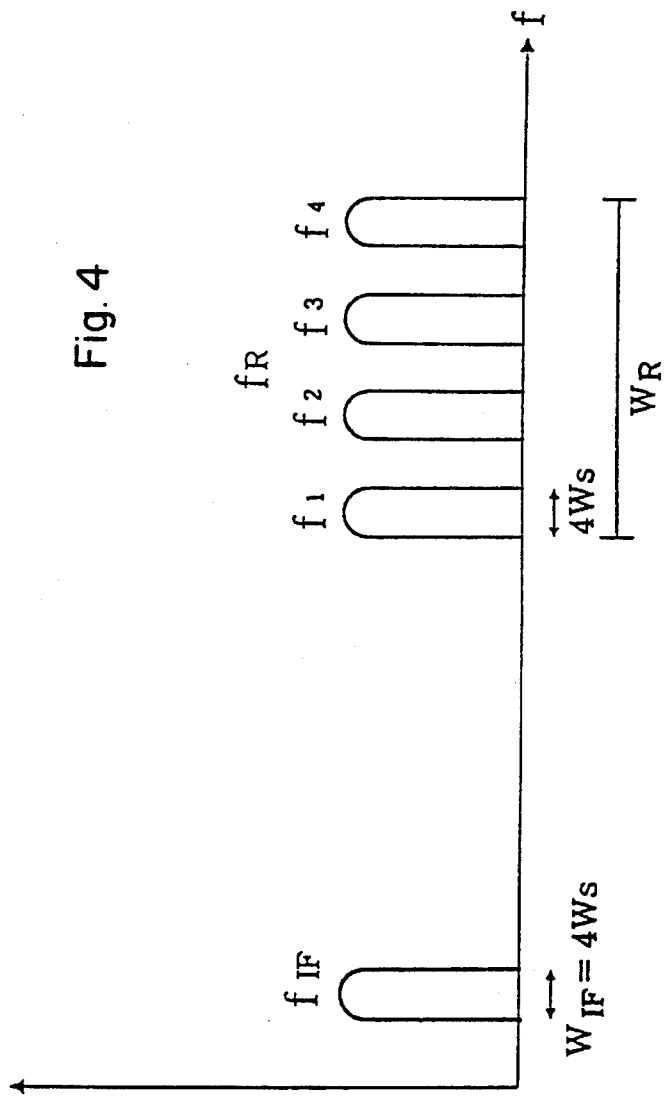
FIG. 4 indicates the relation in the receiver among received radio frequencies $f_R$, received intermediate frequency $f_{IF}$, system bandwidth $W_R$, and intermediate frequency bandwidth $W_{IF}$.

FIG. 4 indicates the relationship in the receiver among the received radio frequencies $f_R$, the received intermediate frequency $f_{IF}$, the system bandwidth $W_R$, and the intermediate frequency bandwidth $W_{IF}$, showing an example where the chip number K equals 4. Letting the non-spread signal bandwidth be $W_S$, the bandwidth of the signal that has been spread over K chips will be a multiple K of this. In the present case, this multiple will be 4. In FIG. 4, the hopping signals are distributed evenly across the system bandwidth $W_R$. When these are to be converted to the intermediate frequency band, the frequencies of the frequency synthesizer 22 are controlled in such manner that all the hopping signal carrier frequencies become $f_{IF}$.

Figure 5:
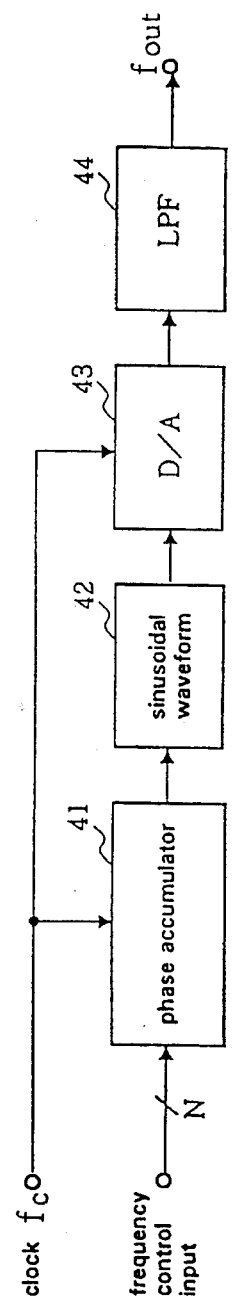
FIG. 5 is a block diagram showing an example of a frequency synthesizer for fast frequency hopping.

FIG. 5 is a block diagram showing an example of a frequency synthesizer for fast frequency hopping which can be used for the frequency synthesizers 13 and 22. This example employs a direct digital synthesizer (DDS) and is provided with a phase accumulator 41, a look-up table 42, a digital-to-analog converter 43, and a low-pass filter 44. The phase accumulator 41 specifies read addresses to the look-up table 42 in response to the frequency control input. The output of the look-up table 42 is converted to an analog signal by the digital-to-analog converter 43, and output via the low-pass filter 44.

Figure 6:
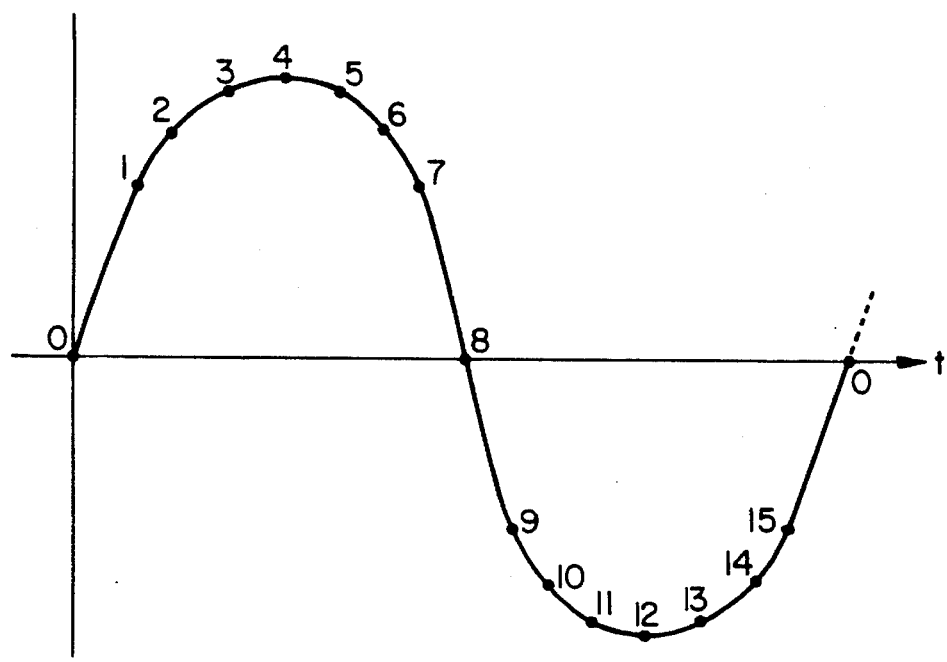
FIG. 6 shows an example of sample values which have been written in a look-up table at the addresses indicated.
Figure 7:
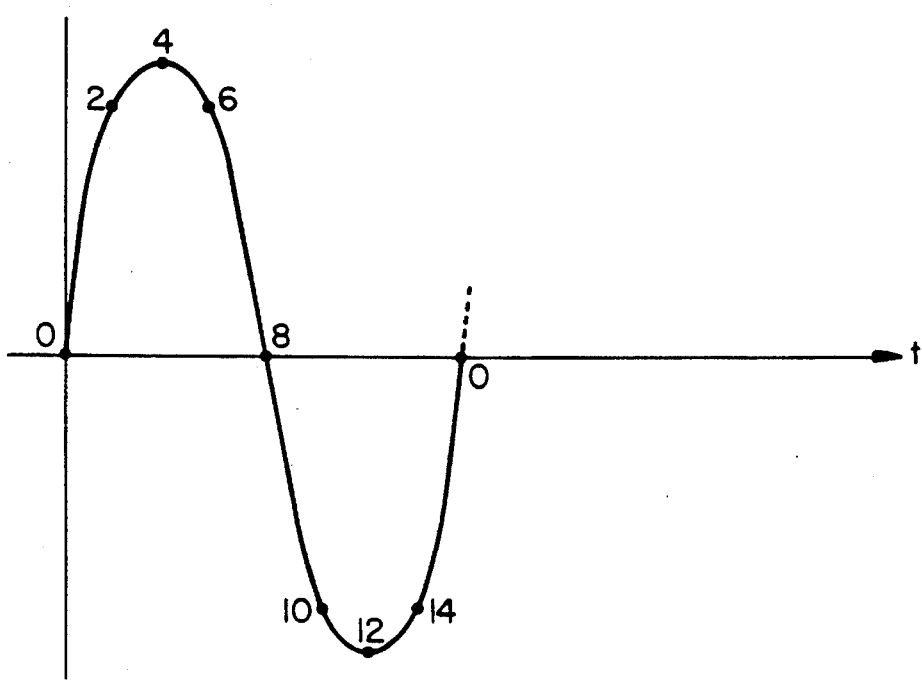
FIG. 7 shows an example of an output waveform.

A read-only memory in which a sinusoidal waveform is stored may be used for the look-up table 42, in which case a carrier signal of any frequency is formed by specifying the read addresses in this memory. For example, sinusoidal waveform sample values such as those shown in FIG. 6 are written into the look-up table 42. For simplicity, the number of samples in this figure is 16, and for these samples there are corresponding address from "0" to "15". These sample values are read at a fixed clock period. To output a comparatively low frequency waveform, addresses "0", "2", "4", "6", etc., may, for example, be example be specified and read in order. The waveform resulting from this is shown in FIG. 7. To output a waveform with a higher frequency than this, addresses "0", "4", "8", "12", etc for example could be specified and read in order. Therefore, the frequency can be changed by changing the address specification in this manner.

Figure 8:
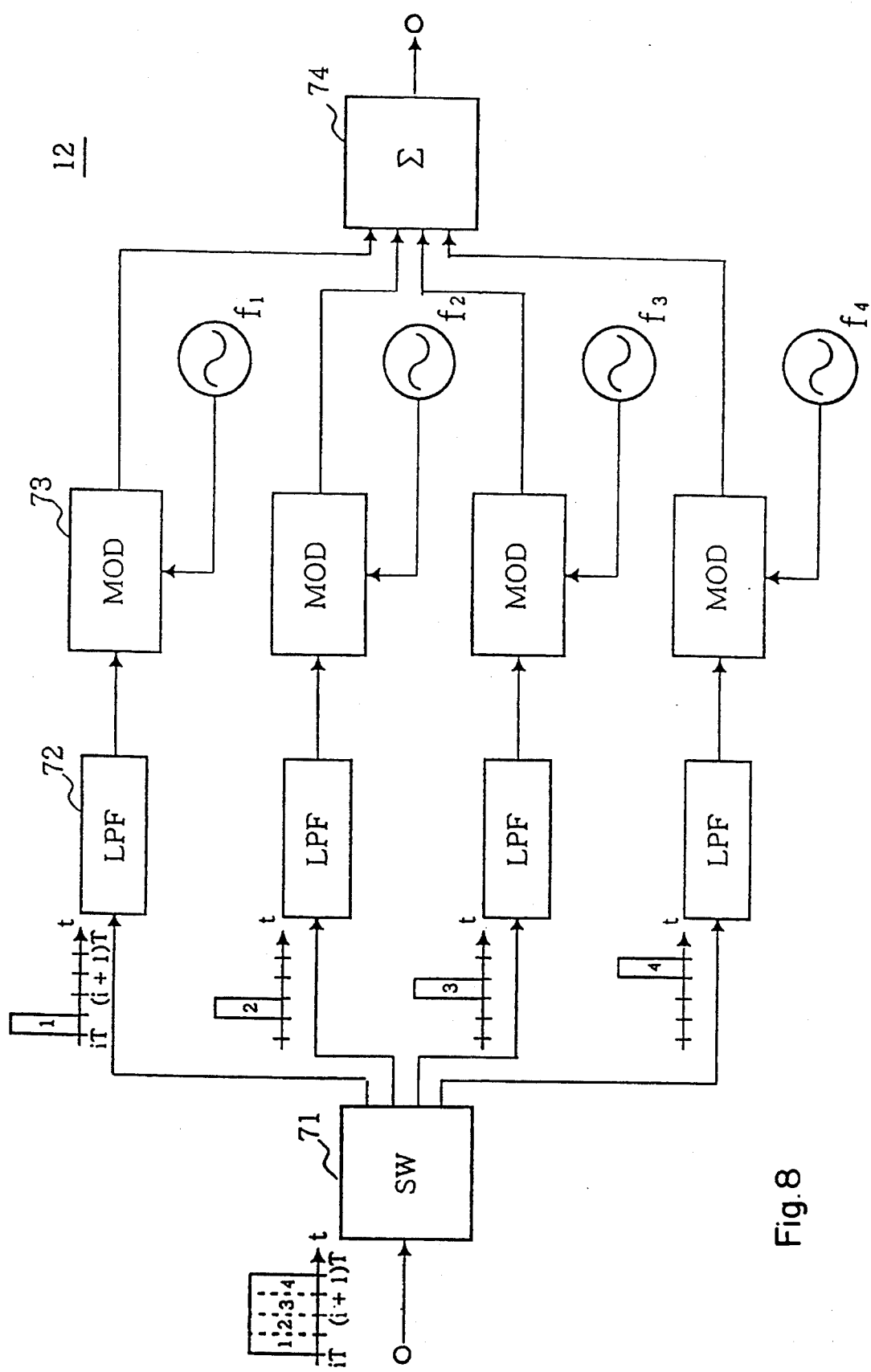
FIG. 8 shows another example of a chip modulator and chip modulation means.

FIG. 8 shows another example of a chip modulator. If the carrier signal frequency is changed over instantaneously when the frequency is hopped, as shown in FIG. 2, the change in phase and frequency of the chip-modulated wave will be abrupt. The transmission spectrum will therefore contain numerous side lobes and a broad bandwidth will be necessary. It is desirable to have a narrow transmission spectrum, and the chip modulation means shown in FIG. 8 is designed to achieve this. In the following explanation, it will again be assumed that K=4.

In this example, the chip modulator is provided with four separate subsystems each comprising a low-pass filter 72 and a quadrature modulator 73. Mutually different carrier frequencies are supplied to the quadrature modulators 73. A switching circuit 71, which switches these subsystems, and a combiner 74 which combines them, are also provided. Each chip of the coded chip signal is distributed in turn to one of four branches by the switching circuit 71. A narrow-band coded chip signal waveform is formed by waveform shaping these coded chip signals by low-pass filters 72. The impulse response of the waveform shaping may be a sampling function, a (root-)cosine roll-off function, or various windowing functions. In order to obtain a special waveform, the waveform may be shaped after that waveform has been written into a ROM. These waveform-shaped coded chip signals are modulated by the quadrature modulators 73 and combined by the combiner 74.

Figure 9:
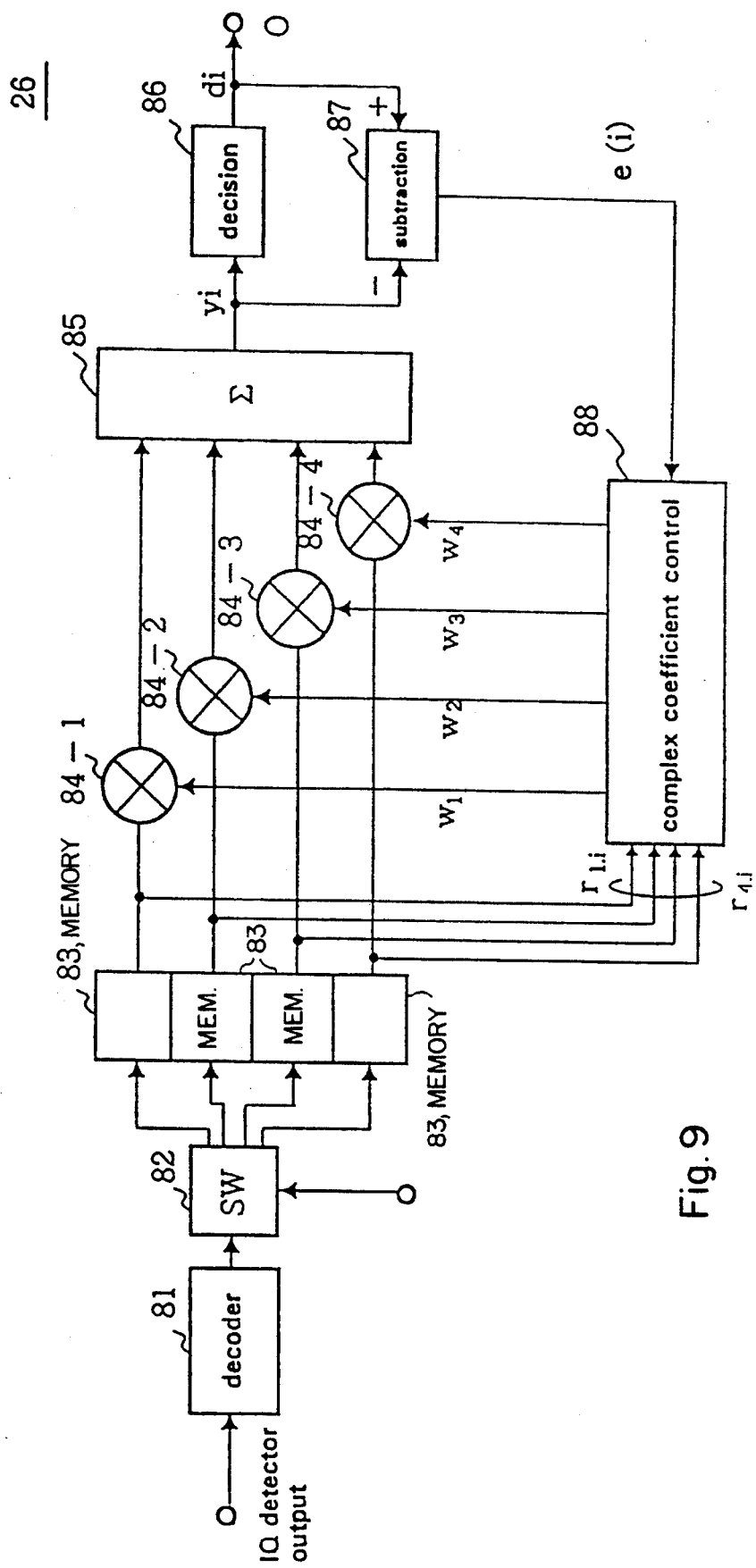
FIG. 9 is a block diagram showing an example of a demodulator.

FIG. 9 is a block diagram showing an example of a demodulator 26. The example shown here employs linear demodulation.

This demodulator is provided with a decoder 81 for decoding the signals that have been coded by the transmitter side encoder 11. It is also provided with a switch 82, memory 83, and complex multipliers 84-1 through 84-4, which together multiply the K complex envelope signals by respective complex coefficients. The demodulator is also provided with a combiner 85 and a decision circuit 86, which combine the complex envelope signals that have been multiplied by the complex coefficients, and carry out symbol decision. The demodulator is further provided with a subtracter 87 and a complex coefficient controller 88, which set the complex coefficients in accordance with the decision result in the case of a training signal with a predetermined pattern.

The decoder 81 decodes corresponding to the coding on the transmitter side. This gives a complex envelope signal in which K chips correspond to one symbol, and this is stored in the memory 83 via the switch 82. The switch 82 is controlled synchronously with the operation of the frequency controller 23. The complex multipliers 84-1 through 84-4 multiply the complex envelope signals that have been stored in the memory 83 by the complex coefficients $W_1$ to $W_4$, which have been set by the complex coefficient controller 88, and the combiner 85 combines these multiplied signals. The decision circuit 86 performs a data decision on the combined signal $y_i$ that has been output from the combiner 85, thereby completing the demodulation of the transmitted symbols.

The setting of complex coefficients $W_1$ through $W_4$ by the complex coefficient controller 88 involves obtaining the difference between the input and output signals of the decision circuit 86 by means of the subtracter 87. The coefficients are then determined on the basis of this error by a least squares method using a known training signal. The specific operations involved will now be explained.

The complex multipliers 84-1 to 84-4 weight the complex envelope signals r(t) with the complex coefficient vectors $W_{i-1}$ obtained at time i−1, and the combiner 85 combines these to generate combined signal $Y_i$. The combined signal $y_i$ can be represented by:

$$y_i = w_{i-1} r_i^H \qquad (11)$$

where $\omega_{i-1}$ and $r_i^H$ are the following vectors:

$$r_i^H = (r_1^*, r_2^*, r_3^*, r_4^*) \quad w_{i-1} = (w_1, w_2 w_3, w_4) \qquad (12)$$

The superscript H indicates an Hermitian (complex conjugate) transpose. The data decision of this combined signal $y_i$ is then carried out and decision result $d_i$ is output. Error $e_i$ is calculated using this decision result $d_i$ and the combined signal $Y_i$, as follows:

$$e_i = d_i - y_i \qquad (13)$$

This error $e_i$ is input to the complex coefficient controller 88 and the complex coefficient vectors $W_i$ calculated on the basis of, for example, a least squares method. Ideally, each component $W_k$ of the complex coefficient vector $W_i$ will become approximately equal to $A_k^*$ for complex envelope component $A_k$. The combined signal $y_{i+1}$ is then obtained using this complex coefficient vector $W_i$. A demodulation of the symbols is carried out by repeating the foregoing operations.

The value of the complex coefficient vector $W_i$ is initially made to converge by using a training signal. During this training process, real decision values are not used as $d_i$ in Eq. 13, instead a training signal which is known at the receiver side is used. This reduces the probability of a wrong decision to zero and ensures that convergence is achieved. It is desirable to use a training signal with a single peak autocorrelation function.

The training signal can be placed in a variety of positions, not just at the front of the burst. For example, the training signal may be positioned near the middle of the burst and once the data preceding this has been stored in some sort of memory, the channel impulse response estimation will be carried out backwards from the rear part of the signal. The training signal may be placed at both ends of the burst signal. When a training signal has been positioned at the front or near the middle of the burst, if the receiving level has become low in the interval occupied by the training signal as a result of fading fluctuations etc., the channel impulse response cannot be estimated satisfactorily and numerous errors may occur in the data part. So by dividing the training signal and placing it before and after the burst, it becomes highly probable that an adequate receiving level will be obtained in one or other of the training intervals. There are various options for channel impulse response estimation when there are two training signal intervals within a burst. For example, a channel impulse response may be estimated for all the data using the training signal with the higher receiving level, or the results of estimation with a leading training signal may be used for data in the first half of the burst and a rear training signal used for data in the second half of the burst.

Figure 10:
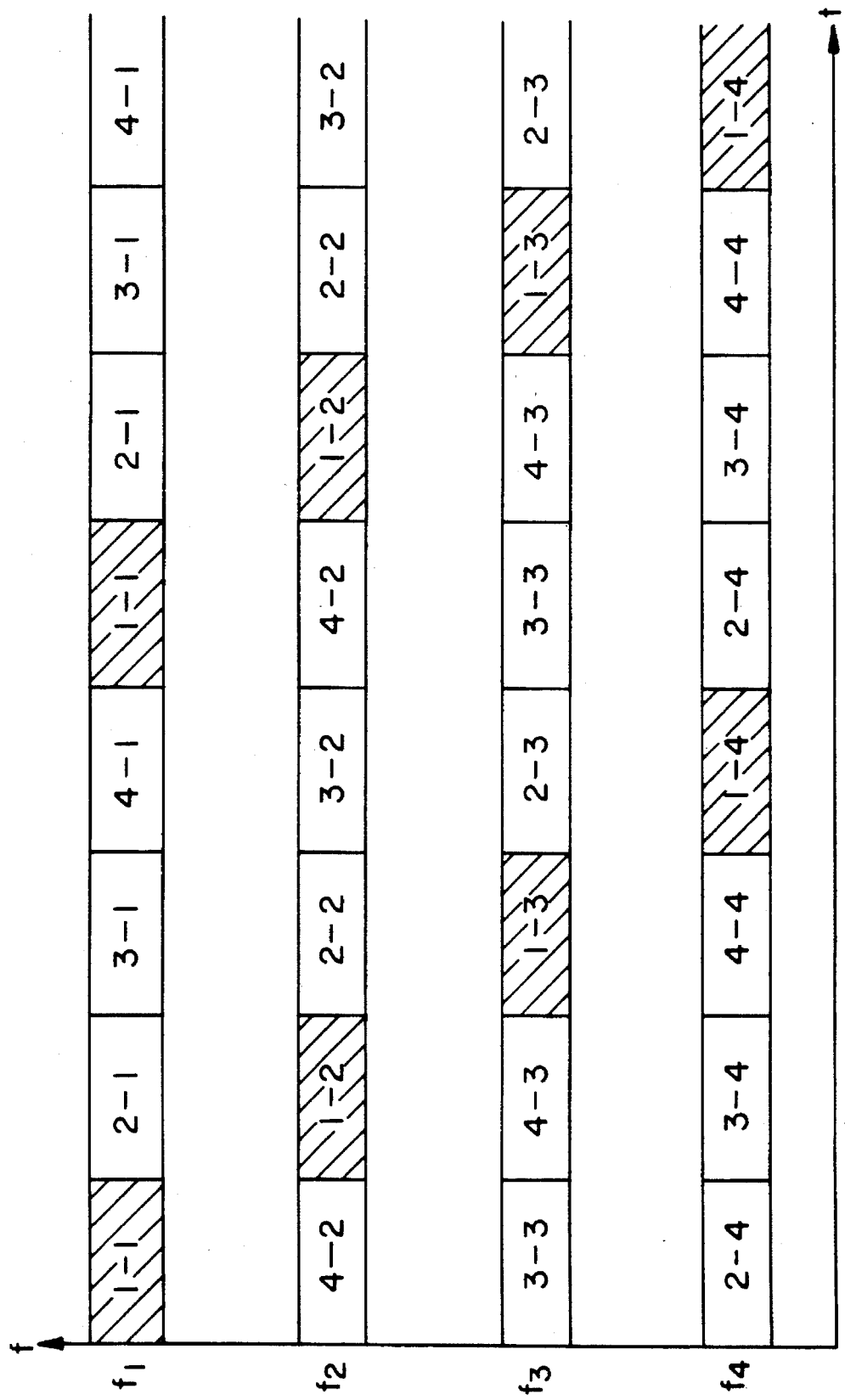
FIG. 10 shows signal format in transmission from a base station to mobile stations.

FIG. 10 shows the signal format in transmission from a base station to mobile stations. In a frequency-hopping system, when signals are transmitted from a base station to mobile stations, a plurality of users are in effect using a single frequency by means of time division. In FIG. 10, which gives an example where the number of chips K=4 and the number of users M is 4, the $k^{th}$ (k=1 . . . , K) coded chip signal of the $m^{th}$ (m=1, . . . , M) user is expressed as m-k. In the case of a signal to the first user, for example, frequency $f_1$ is used to transmit the first coded chip signal, and frequencies $f_2$, $f_3$ and $f_4$ are used to transmit the second, third and fourth coded chip signals, respectively.

Figure 11:
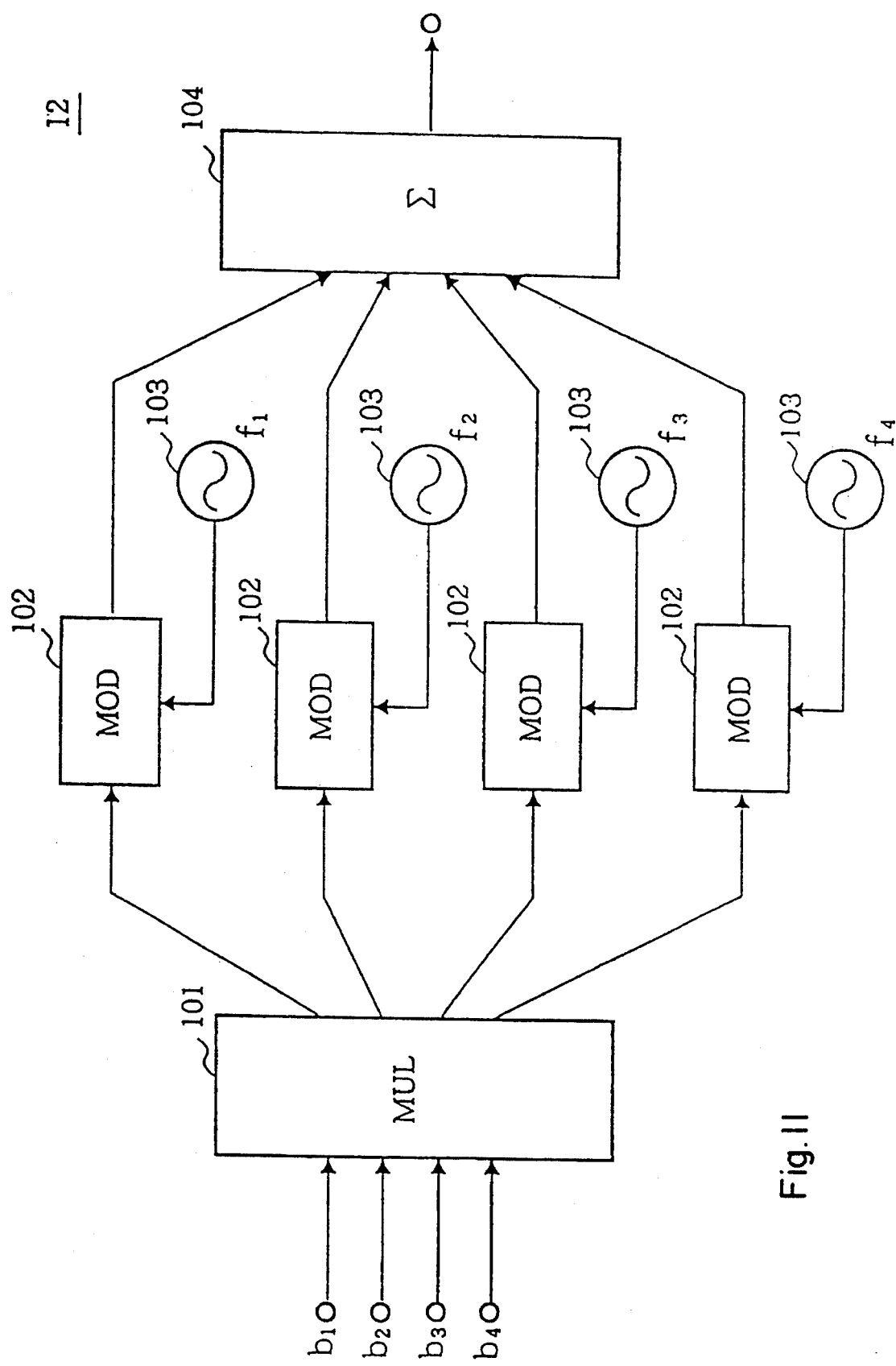
FIG. 11 shows another chip modulator chip modulation means for transmitting a signal.
Figure 12A:
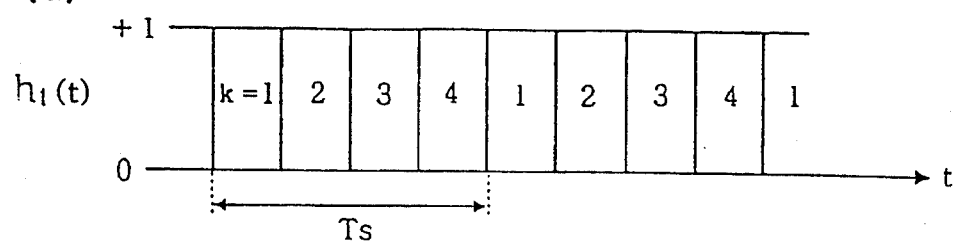
FIGS. 12(a) to 12(d) shows an example of orthogonal functions.
Figure 12B:
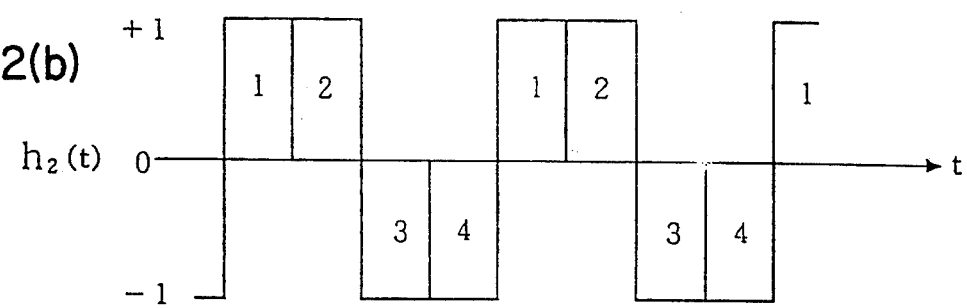
Figure 12C:
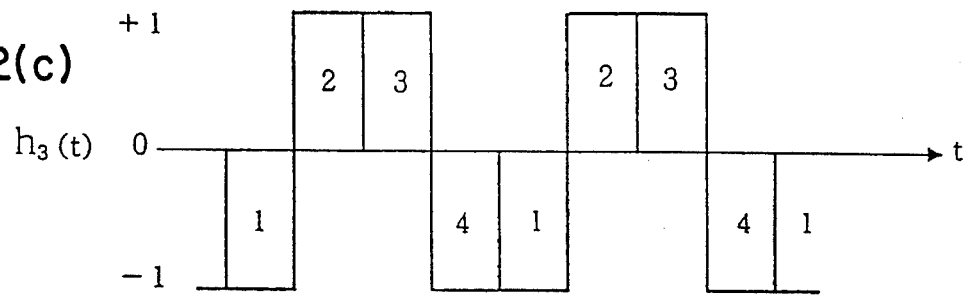
Figure 12D:
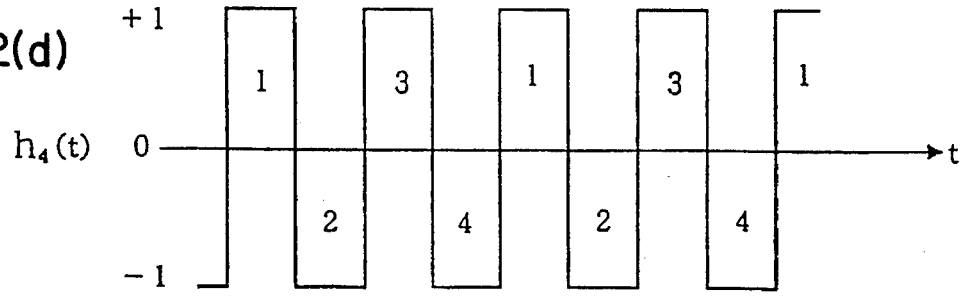

FIG. 11 shows an example of a chip modulator means for transmitting such a signal. This example utilizes a TDMA scheme transmitter, and is provided with a multiplexing circuit 101, four subsystems each comprising a modulator 102 and an oscillator 103, and a combiner 104 which combines the signals from the four subsystems. Each of the four user signal sequences $b_1(t)$, $b_2(t)$, $b_3(t)$ and $b_4(t)$ are assigned chip by chip to frequencies $f_1$, $f_2$, $f_3$ and $f_4$, respectively, and the chips are modulated by separate modulators 102. In this case, the frequencies of the oscillators 103 should be fixed at $f_1$, $f_2$, $f_3$, $f_4$, respectively, and frequency hopping is not necessary.

When fast frequency hopping of K chips is carried out, because signal bandwidth is increased K times, the frequency utilization efficiency decreases by 1/K. In order to improve this drop in efficiency, a plurality of symbol sequences can be transmitted simultaneously at the same frequency. In other words, the same frequency can be used simultaneously by a plurality of users. However, if the same frequency is simply used by a plurality of users, the signals of the other users will result in interference and so demodulation at the receiver side becomes difficult. At the encoder 11, therefore, in respect to symbol sequences which use the same frequency, the chips of the various symbol sequences are pre-multiplied by mutually orthogonal signals. Walsh functions may be used as these orthogonal signals.

FIGS. 12(*a*) to 12(*d*) show an example of orthogonal functions $h_m(t)$ (where m=1, . . . , 4) where the number of chips K=4 and the number of users M using the same frequency is 4. Coded chip signals are formed by multiplying the chips of the four respective symbol sequences by $h_m(t)$. Multiplexing is then accomplished by adding these coded chip signals. For chip k, $h_m(t)$ is given by:

$$h_m(t) = h_{m,k} \quad (14)$$

and it assumed that $h_m(t)$ satisfies the ortho-normal conditions:

$$\Sigma h_{m,k} h_{m,k}^* = 1 \quad (15a)$$

$$\Sigma h_{m,k} h_{m',k}^* = 0 \quad (15b)$$

where $\Sigma$ is the summation from k=1 to K, $h_{m,k}^*$ is the complex conjugate of $h_{m,k}$, and M'≠m.

Walsh functions are taught in Japanese Patent Application 5-145127, incorporated herein by reference, as sequences $h_{m,k}$ that satisfy such ortho-normal conditions, but numerous other functions can be used for this as well. For example, if the $k^{th}$ element of the $m^{th}$ complex column vector forming unitary matrix U is assumed to be $h_{m,k}$, then Eq. 15a and 15b can be expressed as $U^H U = I$, where the superscribed H signifies an Hermitian (complex conjugate) transpose and I is the unit matrix. It follows that the ortho-normal conditions in the complex number domain are satisfied and so this can be used as a multiplexing code. Furthermore, the processing involved in multiplexing will be easier if the absolute value of each element of the unitary matrix is normalized to "1" as with Walsh functions. As an instance of a code where the absolute value of each element of the unitary matrix becomes "1", a formation method using real-valued Bent functions is given by Matsufuji and Suehiro for example, in a paper entitled "Two-phase and four-phase orthogonal matrices derived from Bent." This paper appears in Denshi Jōhō Tsūshin Gakkai Kenkyū Hōkoku [Research Reports of IEICE, Japan] SST92-77, 1993-3.

In order to receive a signal which has been multiplexed by this sort of coding, it has to be decoded at the receiver by complex multiplication by the complex conjugate $h_m^*(t)$ of the orthogonal function $h_m(t)$. In the decoder 81 shown in FIG. 9, the complex envelope signal is complex multiplied by $h_m^*(t)$ and the multiplied signal is input to the switch 82. When the influence of fading is small and the level of each chip is approximately the same, the value of the complex envelope fluctuation $A_k$ will be approximately constant and so the complex coefficients $W_k$ obtained by least squares fitting will be approximately equal to $A_k^*$. This means that each complex envelope is combined with a constant weighting and the $m^{th}$ signal can be extracted using Eq. 15a. Eq. 15b indicates that signals other than the $m^{th}$ become 0. On the other hand, when the influence of fading is considerable and there are differences in level between the complex envelope signals, the least squares method is used to apply larger weighting to the complex envelope signals with higher levels. In this case, because the level of the complex envelope signals being combined is not equal, orthogonal conditions do not hold and it becomes impossible to fully cancel the non-$m^{th}$ signals. Nevertheless, the application of larger weighting to complex envelope signals with higher levels is roughly equivalent to maximal-ratio combining in diversity reception, and so a diversity effect can be anticipated. This means that the components of other channels which cannot be cancelled without establishing orthogonal conditions are suppressed by this diversity effect and the desired channel component can be received.

As has now been explained, multiplexing is possible in coherent combining, with the result being that the decrease in frequency utilization efficiency due to signal bandwidth broadening accompanying fast frequency hopping can be avoided. Since this property is due to the coherent processing, it is a characteristic that is not found in non-coherent fast frequency hopping.

Figure 13:
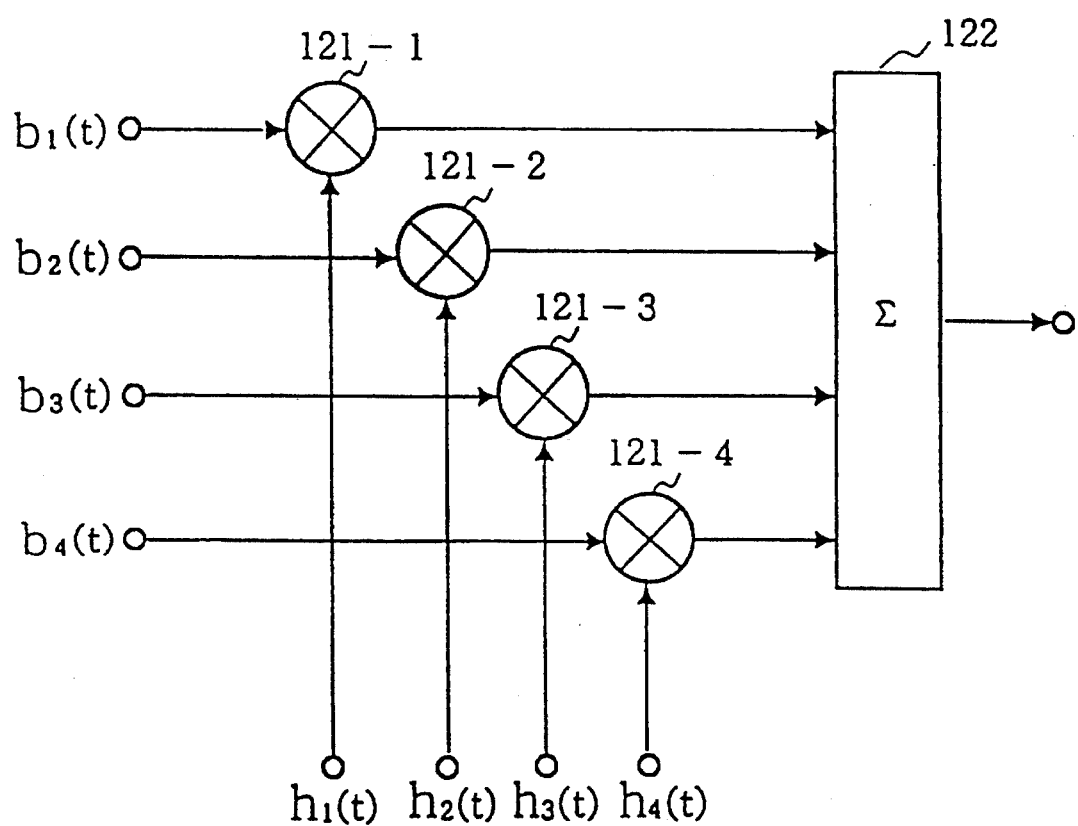
FIG. 13 shows an encoder employed when one and the same frequency is used by a plurality of users. This encoder encodes and multiplexes, on the baseband, the signals of users who utilize one and the same frequency.

When the same frequency is used by a plurality of users, the signals of users utilizing the same frequency may be coded and multiplexed on the baseband for transmission from a base station to mobile stations. An encoder of this sort is illustrated in FIG. 13. This encoder is provided with complex multipliers 121-1 to 121-4 and a combiner 122. User signals $b_1(t)$ to $b_4(t)$ are input to respective complex multipliers 121-1 to 121-4 and respectively multiplied by orthogonal functions $h_1(t)$ to $h_4(t)$. The resulting signals are then combined by the combiner 122. By thus combining in the baseband, the chip modulator requires only a single system.

With the linear demodulation system that was shown in FIG. 9, when fading fluctuation is large, the complex envelope signal level is not constant and therefore, as described above, the cancellation of signals of other users becomes unsatisfactory, with the result being that transmission characteristics deteriorate. Nonlinear demodulation using maximum likelihood estimation is suitable for demodulating while suppressing deterioration due to fading fluctuation. An example is given in FIG. 14.

Figure 14:
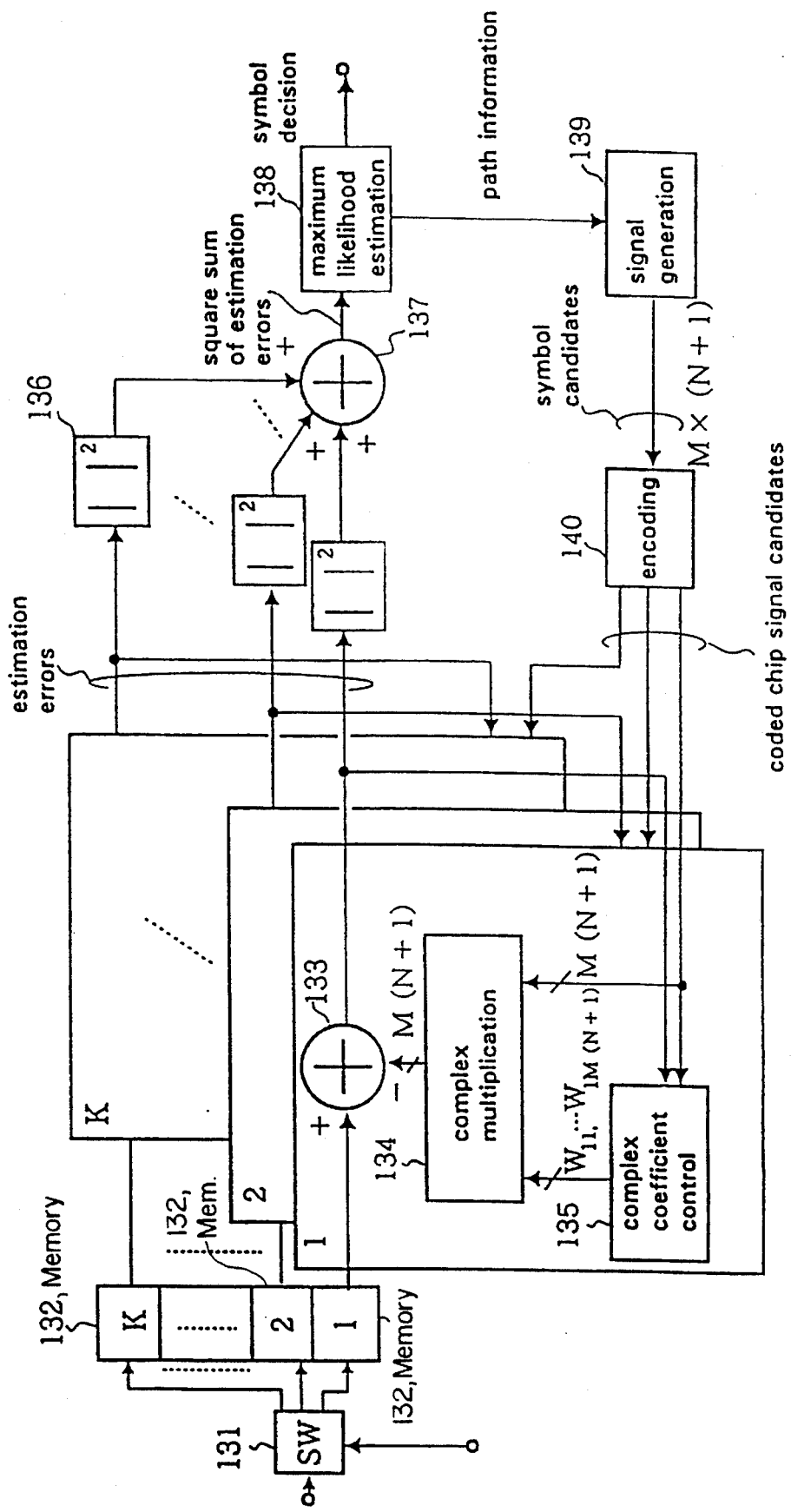
FIG. 14 is a block diagram showing an example of a demodulator which carriers out nonlinear demodulation based on maximum likelihood estimation.

The demodulator shown in FIG. 14 is provided with the following: an encoder 140 which encodes symbol candidates using the same logic as that of the chip encoder on the transmitter side; K sub-systems each comprising a complex multiplier 134 and a complex coefficient controller 135, said K sub-systems obtaining, from the output of the encoder 140, an estimate for each of the K complex envelope signals; K subtracters 133 for obtaining the estimation errors by carrying out respective subtractions of these estimates from the K detected complex envelope signals; K square calculators 136 and adder 137 for obtaining the square sum of these estimation errors; a maximum likelihood sequence estimator 138 which obtains the paths corresponding to the transition of the symbol pattern candidates from one point in time to the next, and then carries out a symbol decision by selecting from among these paths the path for which the square sum of the estimation errors is minimum; and a signal generator 139 which outputs symbol candidates in accordance with the paths obtained by a maximum likelihood sequence estimator 138. In order to carry out the serial-to-parallel conversion of the K detected complex envelope signals, said demodulator is also provided with a switch 131 and memory 132.

The operation of the nonlinear demodulator shown in FIG. 14 will now be explained for the case of QPSK. It is assumed that there is one desired wave containing the modulated signal of a given user, and N interferers containing only the modulated signals of other users. It is also assumed that the signals of M−1 other users are multiplexed in the desired wave in addition to the given user's signal, and that M users are multiplexed in each of the interferers. The total number of signals of other users therefore comes to (N+1)M−1. In QPSK, the signals transmitted from a given user can have 4 symbol patterns, and the signals of other users can have $4^{(N+1)M-1}$ symbol patterns. In the demodulation scheme presently being considered, symbol decision is carried out by estimating the most likely pattern from among these $4 \times 4^{(N+1)M-1}$ transmitted symbol pattern candidates.

First, the complex envelope signals of the K quasi-coherently detected chips are stored in the memory 132 via the switch 131. The switch 131 is controlled synchronously with the operation of the frequency controller 23 (see FIG. 1). In this demodulation scheme, the transmitted symbols are not estimated directly by linear transformations of the complex envelopes. Instead, they are estimated by nonlinear processing. For this reason, a maximum likelihood sequence estimator 138 forms paths corresponding to the transition, from one point in time to the next, of symbol pattern candidates of signals from a given user and other users, and performs a symbol decision by comparing the likelihood of these paths. The total number of paths comes to $4 \times 4^{(N+1)M-1}$, which is the total number of symbol pattern candidates.

In correspondence with this path information, the signal generator 139 outputs (N+1)M symbol candidate sequences, which is the total number of signals from the given user and other users. The encoder 140 encodes the symbol sequence candidates that are output from the signal generator 139 in an equivalent manner to the transmitter side, and forms coded chip signal candidates. The complex coefficient controller 135 obtains estimates of the carrier components of the complex envelope signals. These estimates are the complex coefficients. A training signal is used for the initial estimation. By complex multiplication of these complex coefficients and the coded chip signal candidates in the complex multiplier 134, replicas are formed for the complex envelope signals of the given and other users.

Next, the subtracter 133 subtracts these replicas of the signals of the given and other users from the complex envelope signals stored in memory 132, whereupon estimation errors are obtained. Because these estimation errors are obtained for each complex envelope stored in memory 132, this processing is performed in parallel K times for K chips. In this way, K estimation errors are obtained. These estimation errors are fed back to the complex coefficient controller 135 and used to update the carrier component estimates. In addition, the square sum of the K estimation errors is obtained by means of squaring circuits 136 and an adder 137. This square sum of the estimation errors is found for all $4 \times 4^{(N+1)M-1}$ candidates, which is the total number of paths.

The maximum likelihood sequence estimator 138 selects, from among the $4 \times 4^{(N+1)M-1}$ paths, the path for which the square sum of the estimation errors is smallest, and decides that the symbol candidate corresponding to this selected path is the most likely. In this way, the transmitted symbols are determined.

The nonlinear demodulation scheme explained above differs from the linear demodulation system depicted in FIG. 9 in that channel impulse response estimation is performed not just for the signal of a given user, but also for other users' signals which constitute interfering components, and in that replicas of the received signals are formed. In a linear demodulation system, because other users' signals, which constitute interfering components, are treated on a par with noise, when the orthogonality between a given user's signal and the signals of other users has become unsatisfactory due to fading fluctuation, interfering components end up remaining in the estimation error shown by EQ. 13. It is therefore impossible to make an accurate estimate of a channel impulse response on the basis of the specified error, and so transmission characteristics will deteriorate. As opposed to this, in a nonlinear demodulation system, because a channel impulse response estimation is carried out for the signals of other users as well, the influence of interference by other users' signals is removed from the estimation error and a more accurate channel impulse response estimation is achieved. For this reason, transmission characteristics are superior to those of linear demodulation systems.

Other users who utilize the same carrier frequency can be divided into users in the same base station who have a different code and others users who utilize identical carriers. Although all the signal components of other users contained in the interfering waves and the desired wave are cancelled, when fading is present the cancellation is difficult for both categories of other users, and the required scale of the circuit becomes large. Various simplified configurations for cancelling interference may therefore be used. For example, cancellation may be restricted to the signals of other users in the desired wave, or to those signals of other users in interferers where the same orthogonal code as the signal of the given user is employed, or to a combination of these.

Decreasing the number of interferers in a fundamental way may also be considered as a means of simplification. Decreasing the multiplexing of K users to K/2 will have an especially large reduction effect when K is large. With this method, both local interference and interference from other stations is decreased, but if the aim is to decrease the influence of other stations, the number of hopping channels actually used from among $N_H$ hopping channels should be decreased, to $M_H/2$ for example. If this is done, although the number of users using the same hopping channel will be K, the amount of interference from other stations can be halved by ensuring that there is as little collision as possible at other stations adjacent to the hopping channel.

In the forgoing explanation, the temporal broadening width of the channel impulse response has been regarded as being much smaller than the chip time width. However, the chip time width decreases at higher transmission bit rates or for a larger chip number K, which means that there is the possibility that the channel impulse response width will become larger than the chip width. Under such circumstances, the chips will be delayed and will interfere with succeeding hopping channels which are using the same frequency. For the same reason, there will be interference from preceding hopping channels that are utilizing the same frequency.

Using the sample value of the chip of the succeeding hopping channel to gather together the signal energy may be considered as cancelling interference under this sort of interference condition. Because two chips are combined when this is done, a two-branch diversity effect will be obtained if the fading fluctuation of each chip is independent. However, because the interference canceller has to eliminate the interference of both the preceding hopping channel and the succeeding hopping channel, the circuit scale becomes extremely large. To avoid this, the actual use of hopping channels should be decreased in order to decrease interference, and they should not be used consecutively at the same carrier frequency.

The characteristics of the interference canceller are strongly dependent on the initial convergence obtained with the training signal. To ensure that the interference canceller works well, it is desirable to first synchronize the phase in the signal sequence constituting the training signal, and then to have a small cross correlation between the training signals of the different users. By doing this, interferers (which have no cross correlation) can be regarded as noise, and the coefficients can be controlled so that the error introduced by noise is minimized. However, although the training signals of different users can be easily synchronized within the same base station, special arrangements for ensuring synchronization between base stations are required for users at different stations. If synchronization is not achieved, the resulting time drift can result in the interferer becoming a data signal interval in the training interval of the desired wave. As a result of random modulation, data in the interferer may accidentally become, during the training interval of the desired wave, a signal with correlation characteristics close to those of the training signal of the desired wave. When this happens, because the canceller fails to distinguish between the desired wave and the interferer, cancellation characteristics deteriorate. If synchronization is achieved and the correlation of the training signal is reduced, setting the coefficients on the basis of a least squares method results in obtaining a correlation with the training signal within the time during which this square is averaged. Accordingly, interferers for which there is no correlation are regarded as noise and the coefficients are controlled so that the error introduced by noise becomes minimum.

Figure 15:
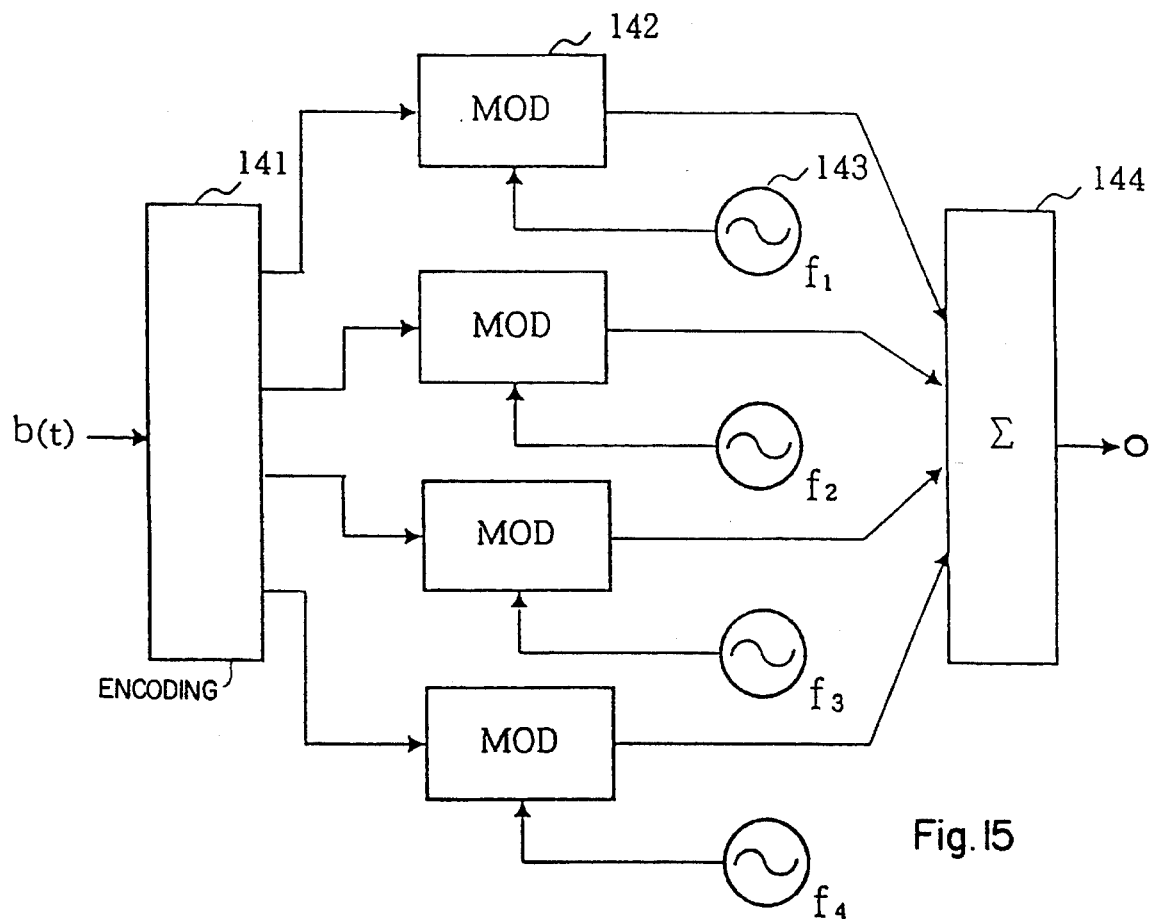
FIG. 15 is a block diagram showing the transmitter in a second embodiment of this invention.
Figure 16:
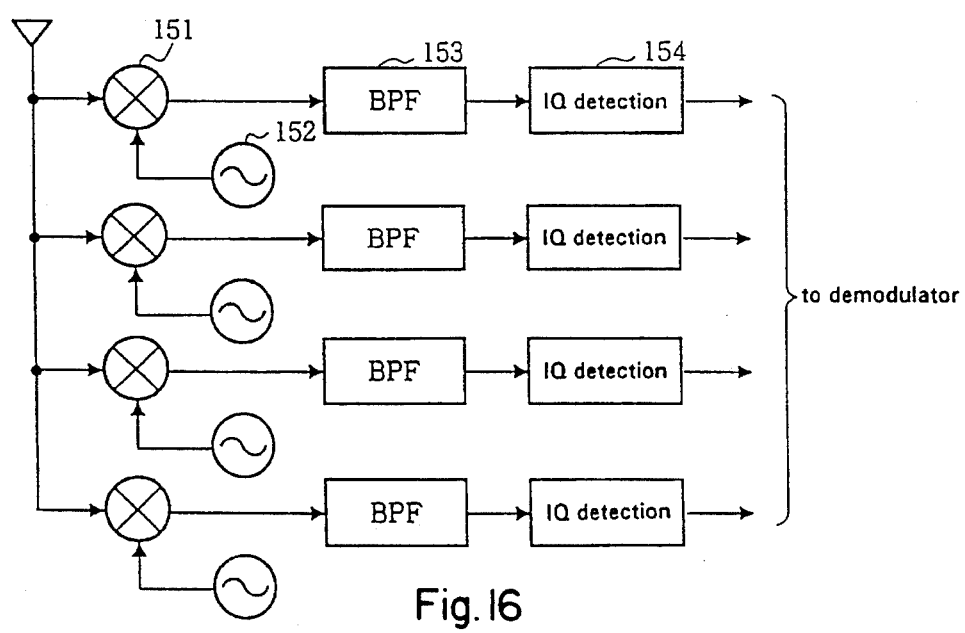
FIG. 16 is a block diagram showing the receiver in a second embodiment of this invention.

FIG. 15 and FIG. 16 are block diagrams showing a second embodiment of this invention, with FIG. 15 showing a transmitter and FIG. 16 showing a receiver. In this embodiment as well, the number of chips K will be taken as 4. In the first embodiment, a frequency diversity effect was obtained by frequency hopping, but in this second embodiment, a frequency diversity effect is achieved by a multi-carrier scheme in which a plurality of carrier signals is used simultaneously. In this present embodiment, there are at most K users who use exactly the same multi-carrier frequencies, and the scheme differs from previous simple multi-carrier schemes in that users are separated by coding the chips resulting from splitting up the symbols of each user. It follows that although the modulation bandwidth of the carriers is increased by a factor of K due to the implementation of the multi-carrier scheme, because K users are multiplexed, the bandwidth per equivalent user does not increase.

The transmitter shown in FIG. 15 is provided with an encoder 141 which divides each symbol of the input symbol sequence into a plurality of chips and, by encoding the resulting chip sequence, outputs K coded chip signals per symbol. The transmitter is also provided with quadrature modulators 142-1 to 142-4 and oscillators 143-1 to 143-4 which serve to modulate each of the K types of carrier frequencies by one of the K coded chip signals, thereby forming K chip modulated waves per symbol. The quadrature modulators 142-1 to 142-4 and the oscillators 143-1 to 143-4 form the K chip modulated waves, which have different carrier frequencies, simultaneously and in parallel.

Figure 17:
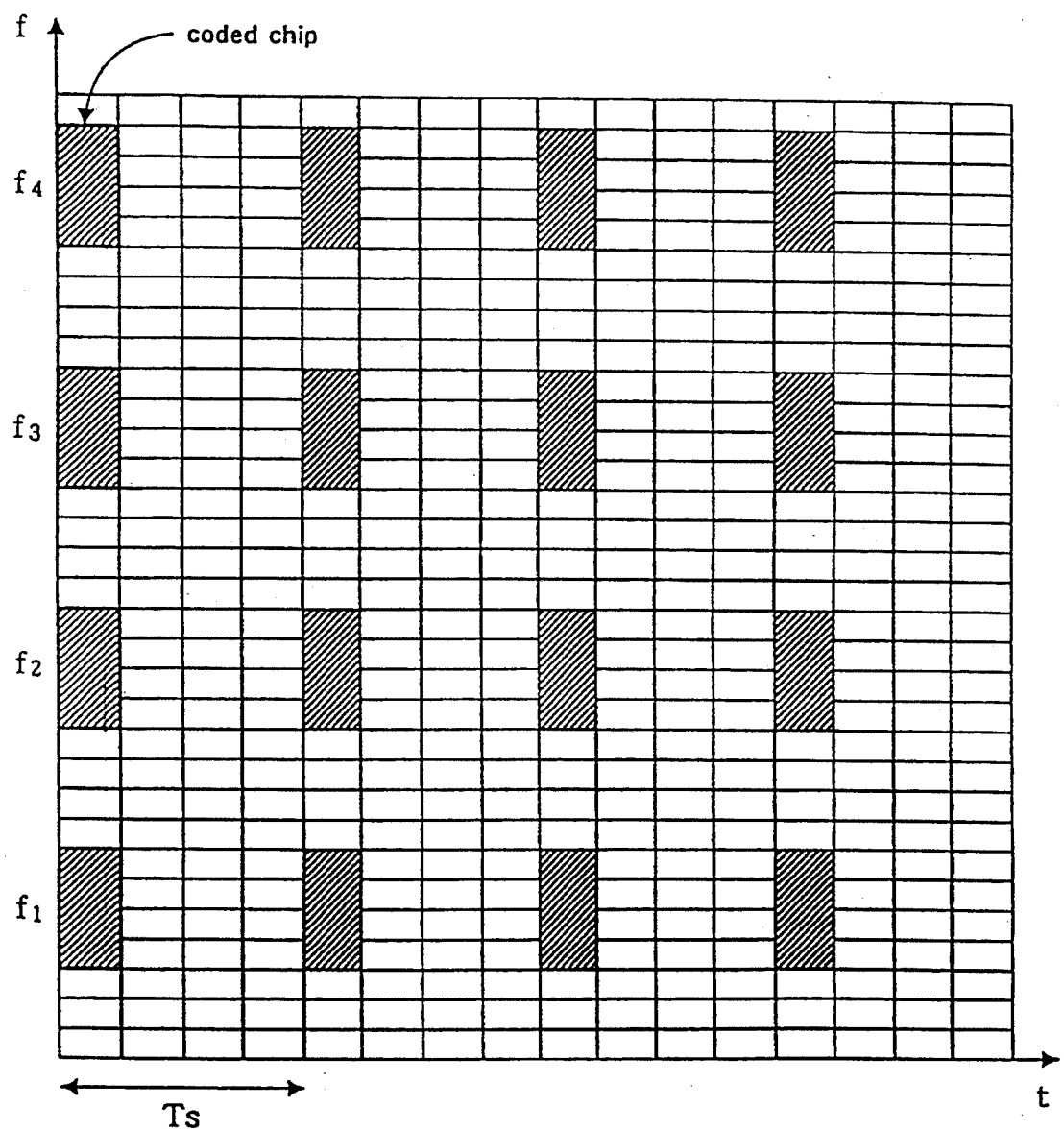
FIG. 17 shows a coded chip signal in the case of multi-carrier.

The encoder 141 outputs the coded chip signals (obtained by splitting one symbol into four chips) after adjusting the timing. The coded chip signals are shown in FIG. 17. The hopping channels which make up one symbol in a frequency-hopping scheme are now multi-carrier channels. The oscillators 143-1 to 143-4 output carrier signals with respective frequencies $f_1$, $f_2$, $f_3$ and $f_4$, and the quadrature modulators 142-1 to 142-4 carry out modulation using these respective carrier signals. In this way, multi-carrier chip modulated waves are formed.

As shown in FIG. 16, the receiver in this second embodiment is formed from four parallel receiving circuits each comprising a mixer 151, a local oscillator 152, a bandpass filter 153 and an IQ detector 154. The envelope signals respectively detected by the four IQ detectors 154 are input to a demodulator of the sort shown in FIG. 9.

In the demodulator employed in frequency hopping, because the complex envelope signals are input serially, a switch and a memory are required for conversion to parallel format. In the case of multi-carrier transmission, however, the envelope signals are input to the demodulator in parallel and so a switch and a memory are not required, and the coding in the encoder can also be handled in parallel. Moreover, because a multi-carrier scheme differs from a frequency-hopping scheme in that signal transmission is carried out using a plurality of frequencies at the same time, there is no necessity for the rapid switching of the synthesizer frequency. However, as shown in FIG. 16, a plurality of local oscillators 152 is required.

Although in the signal shown in FIG. 17, the chip length $T_c$ is taken as 1/K of symbol length $T_s$ (where K=4), another possibility is that $T_s/K < T_c \leq T_s$. In this latter case, a single chip modulated wave will occupy a narrower bandwidth and the operating frequency for modulation and demodulation will be lower. Because the energy per bit increases, transmission characteristics are also improved. Accordingly, it is desirable to reduce the number of simultaneous users and to control chip length appropriately.

Figure 18:
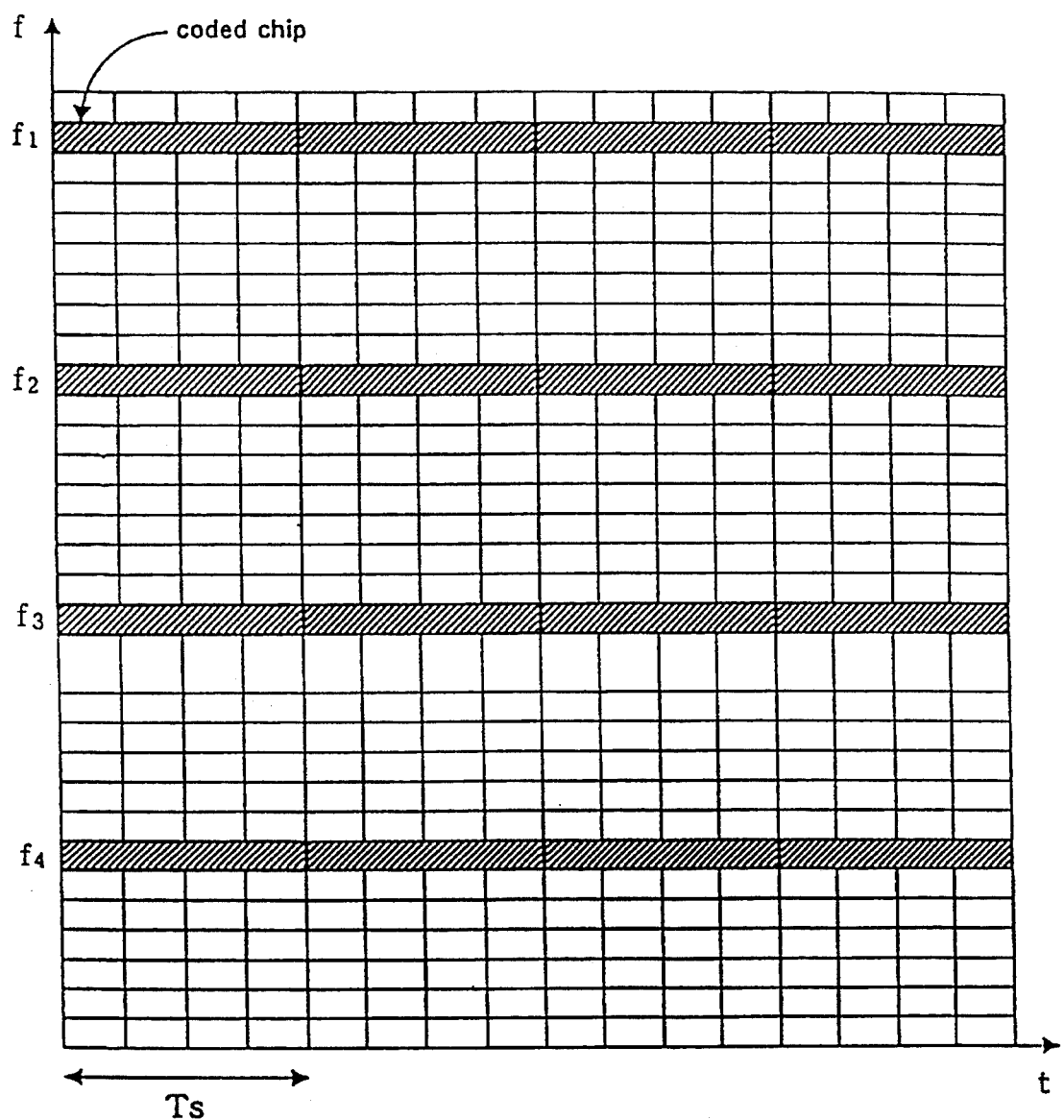
FIG. 18 shows another example of a coded chip signal in the case of multi-carrier.

FIG. 18 shows a signal where K=4 and $T_c = T_s$.

In the case of multi-carrier, the number of users who can actually utilize the system may be decreased in order to reduce the scale of the interference canceller and mitigate the influence of channel impulse response at higher bit rates.

Figure 19:
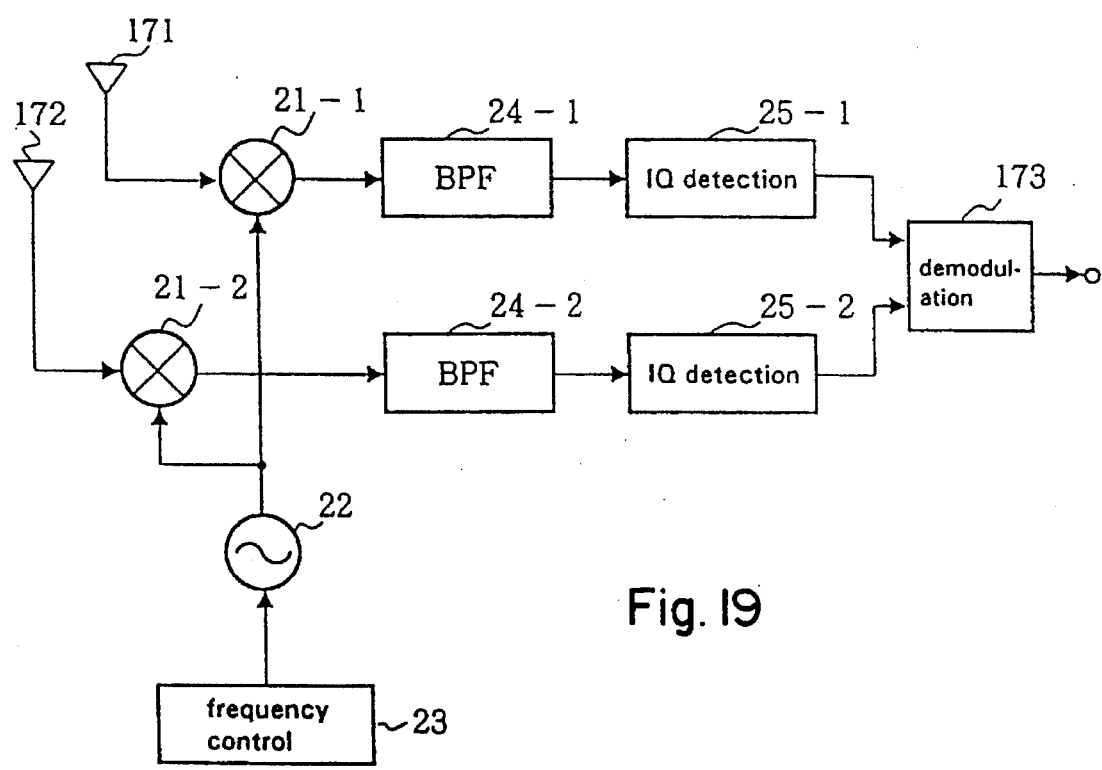
FIG. 19 is a block diagram showing an example of a receiver which combines space diversity with frequency diversity.
Figure 20:
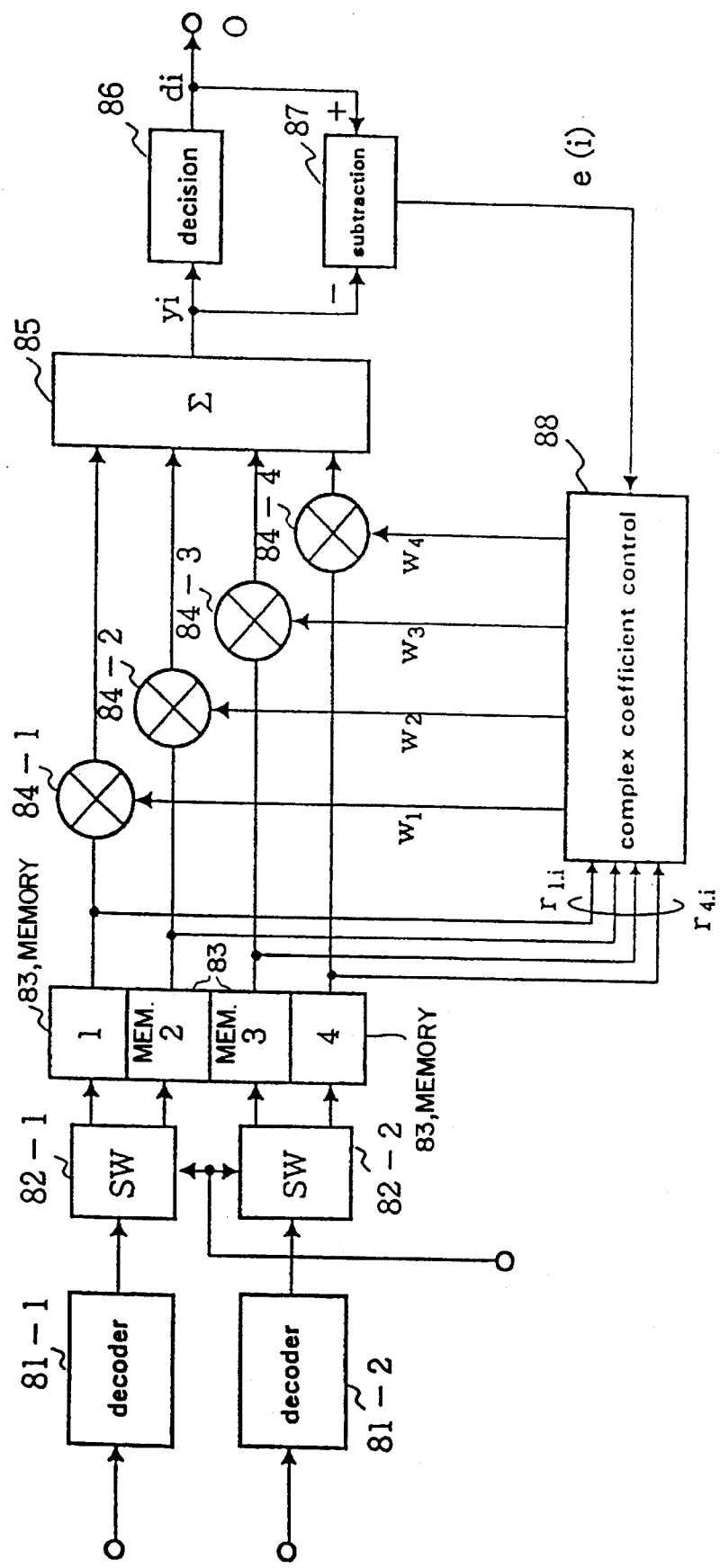
FIG. 20 is a block diagram showing an example of a demodulator which combines space diversity with frequency diversity.

FIG. 19 and FIG. 20 show examples of a receiver and its demodulator in which space diversity has been combined with frequency diversity. By receiving with more than one antenna, a space diversity effect is obtained and transmission characteristics can be further improved. The example shows a receiver configuration shown in FIG. 19 having L (the number of antennas)=2, which is a frequently used configuration in mobile radio communication. The number of chips in this receiver configuration K=2.

The receiver is provided with two antennas 171 and 172. Signals received at the first antenna 171 are input to the demodulator 173 via a mixer 21-1, a bandpass filter 24-1, and an IQ detector 25-1. Signals received at the second antenna 172 are likewise input to the demodulator 173 via a mixer 21-2, a bandpass filter 24-2, and an IQ detector 25-2. Local carriers from the frequency synthesizer 22 are input to the mixers 21-1 and 21-2. The output frequency of the frequency synthesizer 22 is changed by control signals from the frequency controller 23. Given this configuration, signals received by the antennas 171 and 172 are respectively frequency-converted and quasi-coherently detected, thereby giving complex envelope signals. The demodulator 173 demodulates these complex envelope signals.

The demodulator 173 is provided with two decoders 81-1 and 81-2, and two switches 82-1 and 82-2. The first decoder 81-1 decodes the complex envelope signal resulting from the signal received by the first antenna 171 and stores it, via the first switch 82-1, in the first and second areas of the memory 83. The second decoder 81-2 decodes the complex envelope signal resulting from the signal received by the second antenna 172 and stores it, via the second switch 82-2, in the third and fourth areas of the memory 83. These stored complex envelope signals are then combined by the same operation as that explained with reference to FIG. 9, where K=4. The demodulator shown in FIG. 14 can also be altered to a configuration where reception is likewise by more than one antenna.

Figure 21:
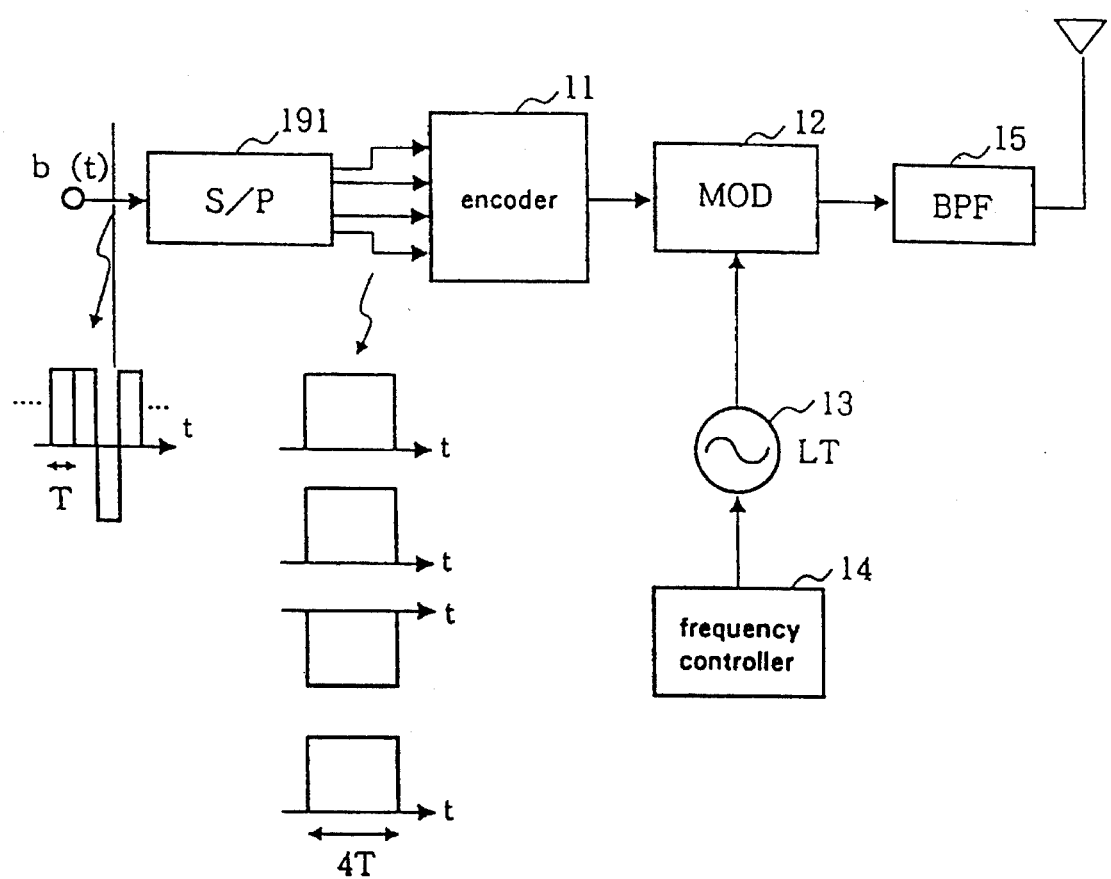
FIG. 21 shows another example of a transmitter according to this invention.

FIG. 21 shows an example of a transmitter configuration with which a single user uses a plurality of channels making even faster transmission possible. Namely, a serial-to-parallel converter 191 is provided, which distributes the signal of a single user among a plurality of channels, just as if a plurality of users were using these channels. In FIG. 21, the distribution is into four channels. This results in a transmission rate decreased by ¼. The four signals resulting from this distribution are divided into chips by (for example) the encoder shown in FIG. 13, whereupon coded chip signals are formed. The transmitter operation subsequent to encoding is identical to the operation of when the same frequency is used by a plurality of users. On the receiver side, demodulation may be carried out by providing the same number of demodulators of the sort shown in FIG. 9 as the signal distribution number on the transmitter side. Alternatively, demodulation may be carried out using the demodulator shown in FIG. 14. With the demodulator shown in FIG. 14, the demodulation involves estimating signal patterns not just for the desired signal but also for interfering signals, and so signals which were regarded as interferers in the embodiment shown in FIG. 1 can be demodulated by being regarded as desired signals.

This invention also provides a lower transmission rate in the course of transmission. One way it achieves this is that it changes over the modulation scheme. For example, if transmission is proceeding using a QPSK modulation scheme, the transmission rate can be halved by changing over to BPSK modulation. Because transmitting power is also halved, this reduces the interference power directed at other users utilizing the same frequency, and decreases the power consumption of the transmitter.

Another method of decreasing the transmission rate would be to insert a known signal within the transmitted symbols. On the face of it, this does not change the transmission rate, but the actual rate of information transmission becomes lower. Because a known signal has been inserted, the accuracy of the channel impulse response estimation is improved and better transmission quality is achieved. It therefore becomes possible to reduce the transmitting power required to achieve a given transmission quality, and so this method also reduces interference and power consumption. If encoding with an error-correcting code is carried out instead of inserting a known signal, the information transmission rate is lowered and transmission quality can be improved. This enables transmitting power to be reduced, with the result that reductions in both interference and power consumption can be achieved.

Figure 22:
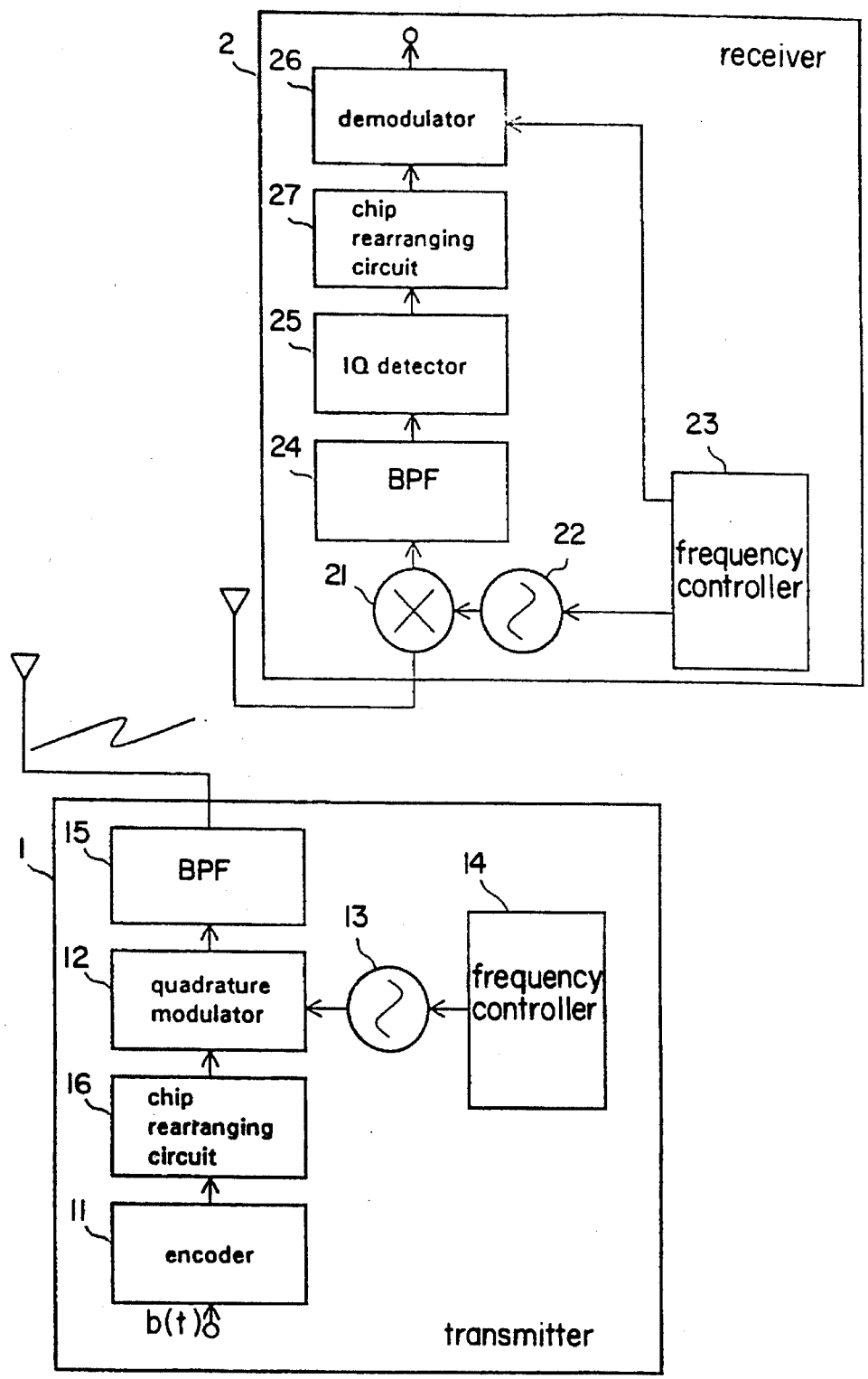
FIG. 22 is a block diagram showing another embodiment of this invention.

FIG. 22 is a block diagram showing another embodiment of this invention.

A device according to this embodiment is provided with a transmitter 1 and a receiver 2. The transmitter 1 divides each symbol of the symbol sequence into K chips (where K is an integer equal to or greater than 2) and transmits these using different carrier frequencies. The transmitter 1 is provided with an encoder 11, a quadrature modulator 12, a frequency synthesizer 13, a frequency controller 14, and a bandpass filter 15. The receiver 2 is provided with a mixer 21, a frequency synthesizer 22, a frequency controller 23, a bandpass filter 24, an IQ detector 25, and a demodulator 26.

A chip arranging circuit 16 has been provided in the transmitter 1 between the encoder 11 and the quadrature modulator 12 whereby the symbol sequence in one burst is transmitted after the order of the chips, obtained by splitting each symbol, is arranged within that burst. Also, a chip arranging circuit 27 has been provided in the receiver 2 between the IQ detector 25 and the demodulator 26.

Figure 23:
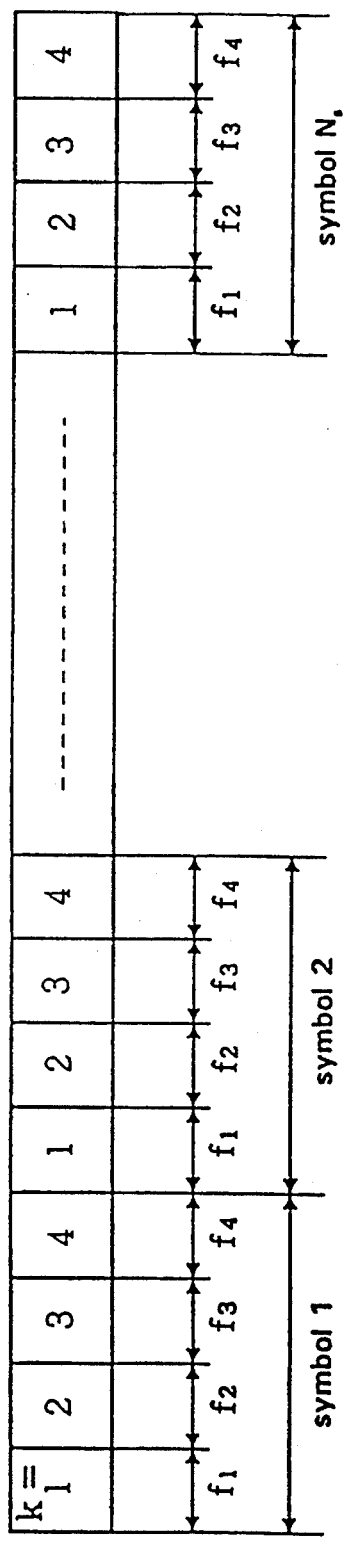
FIG. 23 shows the arrangement of coded chips that are output by the encoder.
Figure 24:
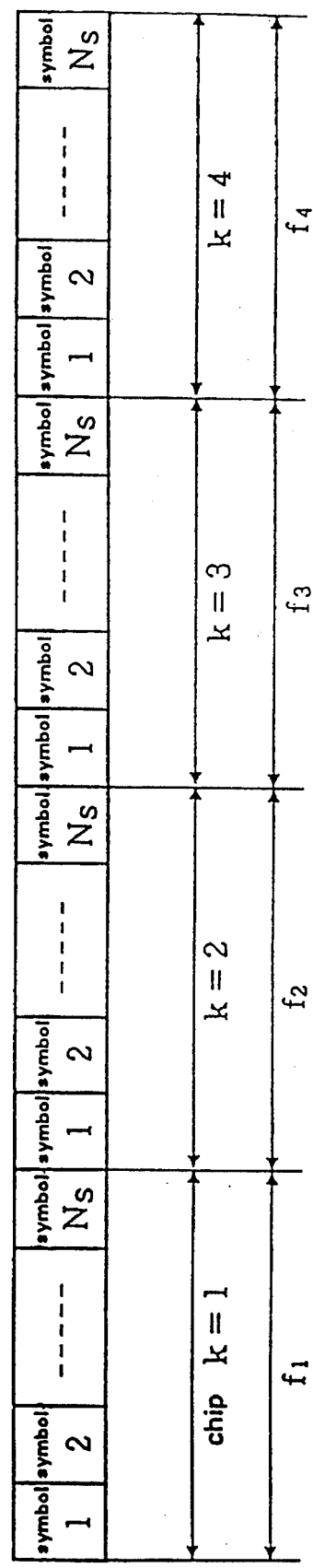
FIG. 24 shows the arrangement of chips that have been arranged by a chip arranging circuit.

FIG. 23 shows the arrangement of coded chips output by the encoder 11, and FIG. 24 shows the arrangement of chips after arrangement by the chip arranging circuit 16. In this embodiment, the logic of carrier frequency change for each individual symbol is the same for the symbol sequences within the burst. Transmitted bursts comprising coded chip signals output by the encoder 11 are stored one burst at a time (each single burst consisting of a training signal and a data signal) by the chip arranging circuit 16, which arranges the order of the chips obtained by splitting each symbol and groups them together by chips that use the same carrier frequency. In this embodiment, the number of chips K=4 and the number of symbols in one burst is $N_s$.

In the receiver 2, the burst configuration shown in FIG. 24 is converted in the chip arranging circuit 27 to the burst configuration shown in FIG. 23, using inverse logic to that of the chip arranging circuit 16 in the transmitter. Namely, chips which have been bundled together by hopping frequency are arranged according to symbol. This ensures that the input to the demodulator 26 has the same burst configuration as in previous embodiments, and that it can be demodulated by a demodulator 26 that is equivalent to the demodulators shown in the previous embodiments.

Figure 25:
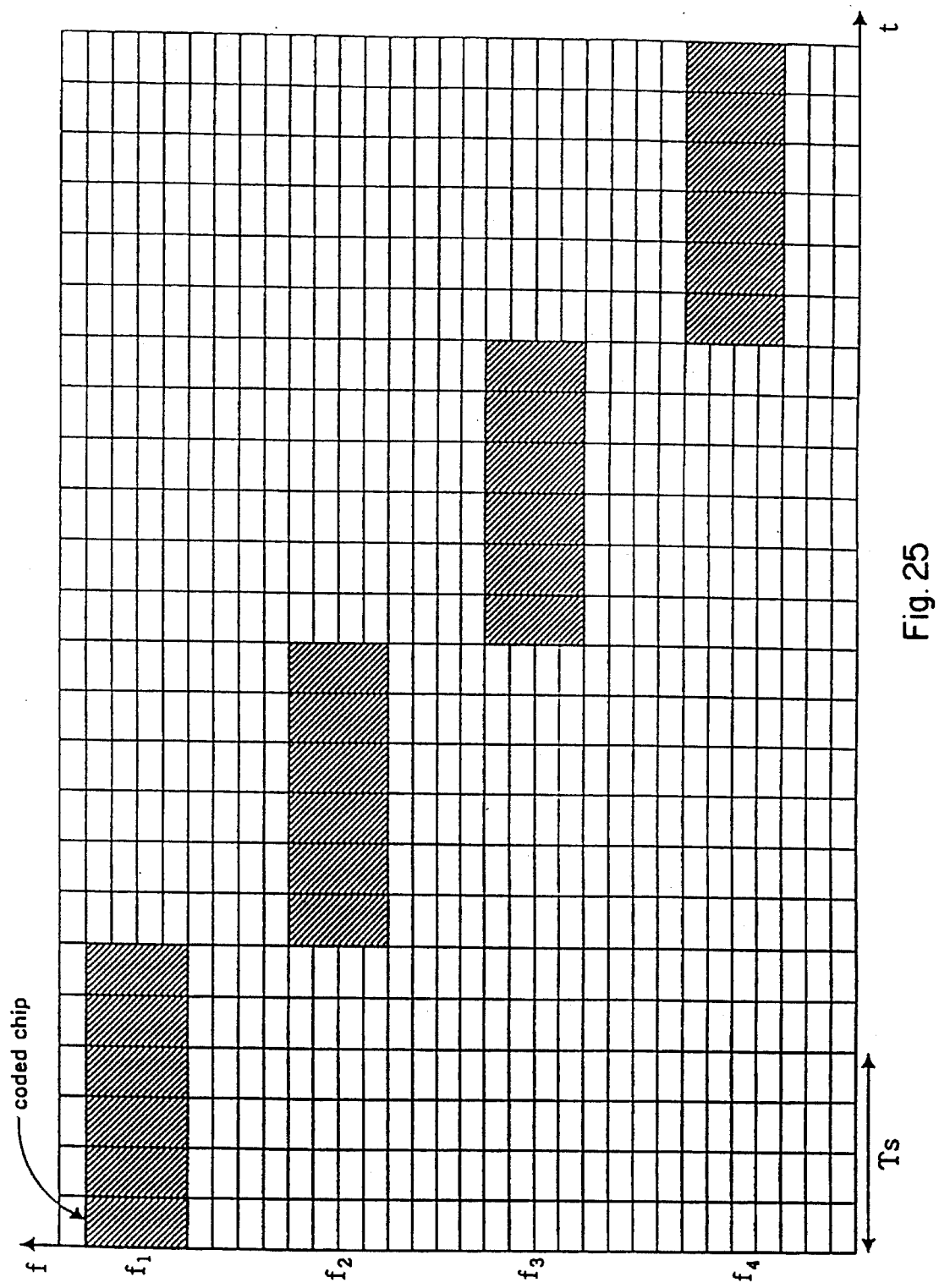
FIG. 25 shows a transmitted signal in the time-frequency domain.

FIG. 25 shows the transmitted signal in the time-frequency domain.

In this embodiment, given that the chip number K=4, by arranging the chips as indicated in FIG. 23 and FIG. 24, the transmission rate of chips which utilize the same frequency is increased by 4 times. This is equivalent to the rate of fading fluctuation in the transmission path for each chip being reduced by 1/K. Good performance can therefore be maintained even under fading conditions with a large maximum Doppler frequency.

Furthermore, because transmission is carried out in this embodiment after chips that use the same hopping frequency have been grouped together, the frequency changeover rate due to hopping is reduced to $1/N_s$ of the changeover rate when chip arrangement is not carried out. For this reason, this embodiment makes it possible to obtain a frequency diversity effect for each symbol in a fast frequency-hopped system, but at a frequency changeover rate which is on a par with that employed in slow frequency-hopping. In addition, the demands placed on frequency synthesizer changeover time are relaxed, so that the hardware implementation is easier.

Figure 26:
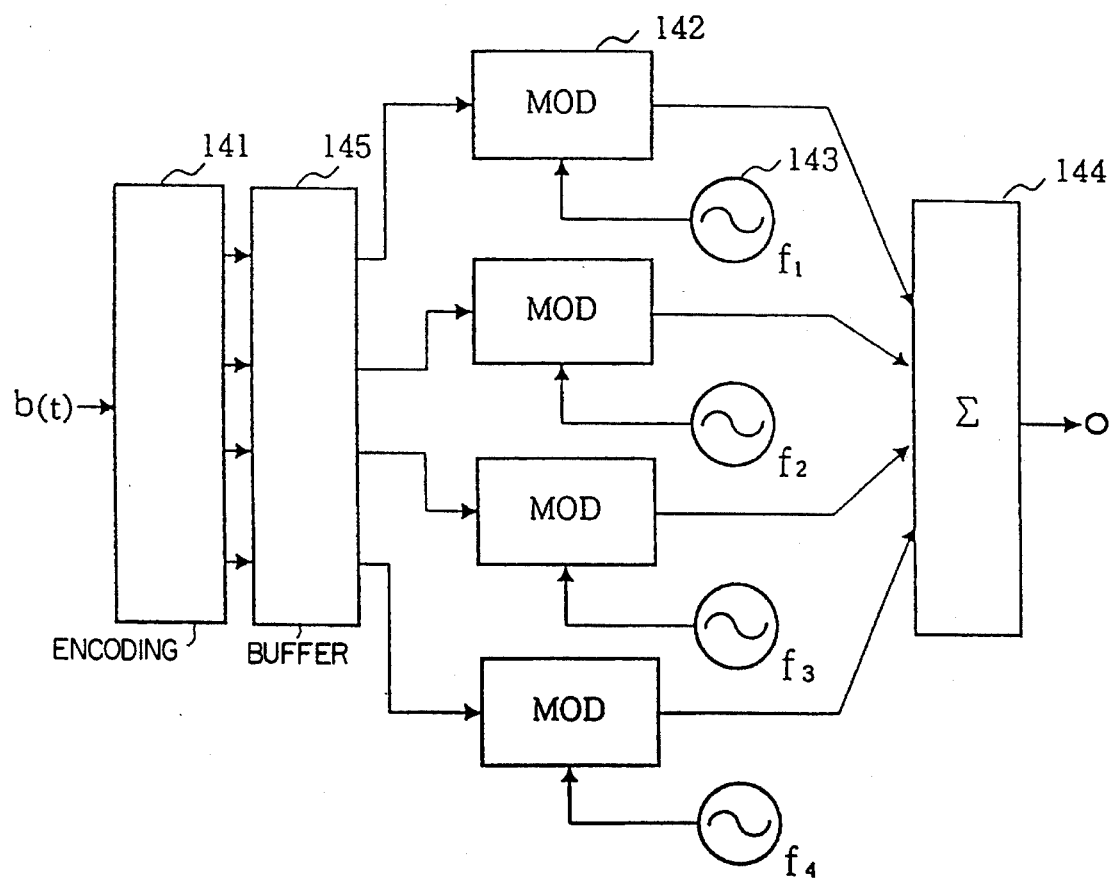
FIG. 26 is a block diagram showing another exemplification of this invention.

FIG. 26 is a block diagram of another embodiment of this invention, and shows a transmitter which is similar to FIG. 15.

Figure 27:
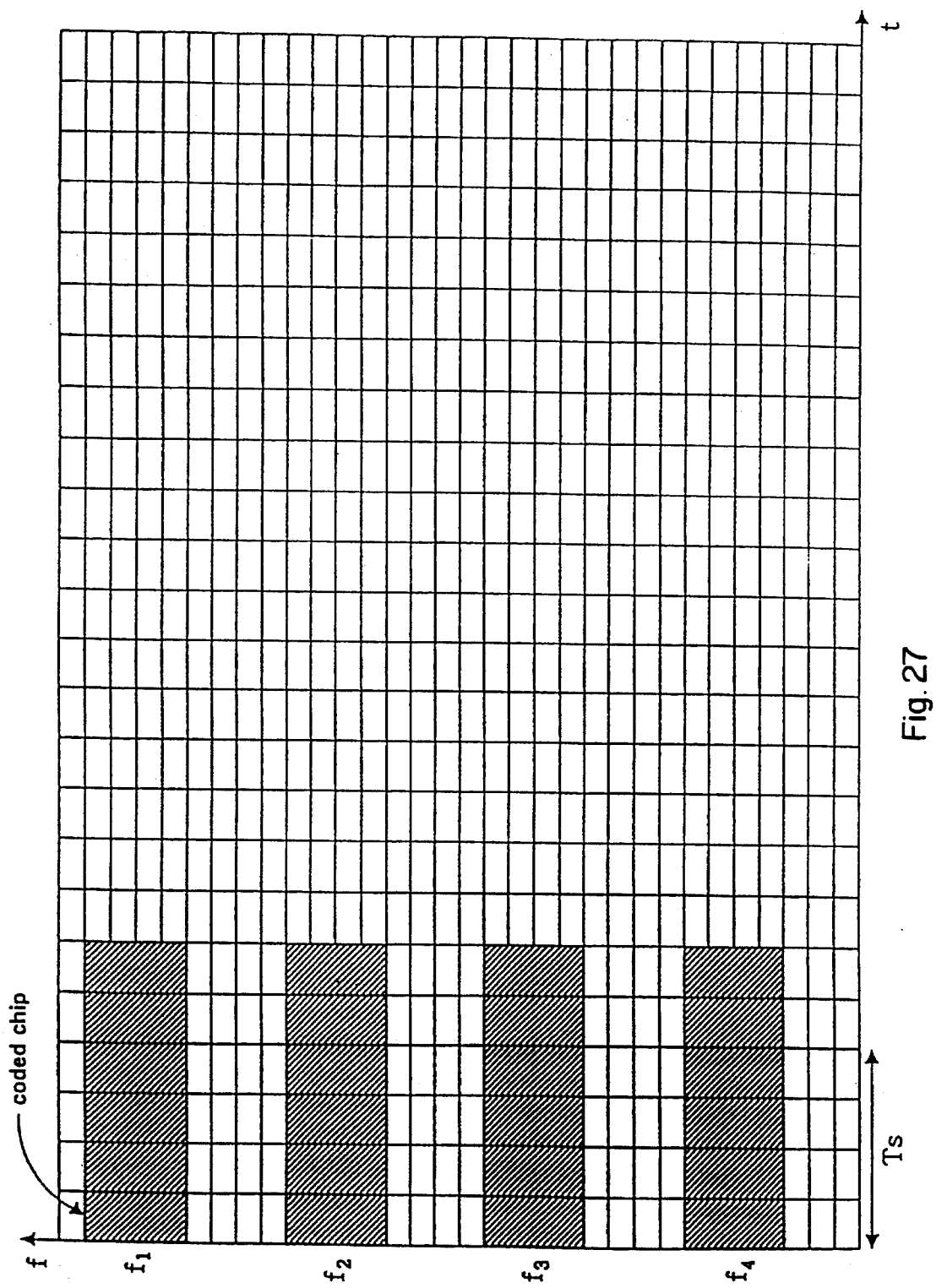
FIG. 27 shows a transmitted signal in the time-frequency domain.

FIG. 27 shows the transmitted signal from this embodiment in the time-frequency domain. This embodiment differs from the embodiment depicted in FIG. 22 in that the transmission is multi-carrier. That is to say, coded chip signals output in parallel from encoder 141 are temporarily stored in buffer 145, and chips that have been grouped together by chip position are transmitted in parallel at different carrier frequencies. The receiver used in this embodiment can be equivalent to the one of the embodiment depicted in FIG. 16. As in the embodiment shown in FIG. 15, although a plurality of oscillators is required in this embodiment, frequency changeover is not necessary.

Figure 28:
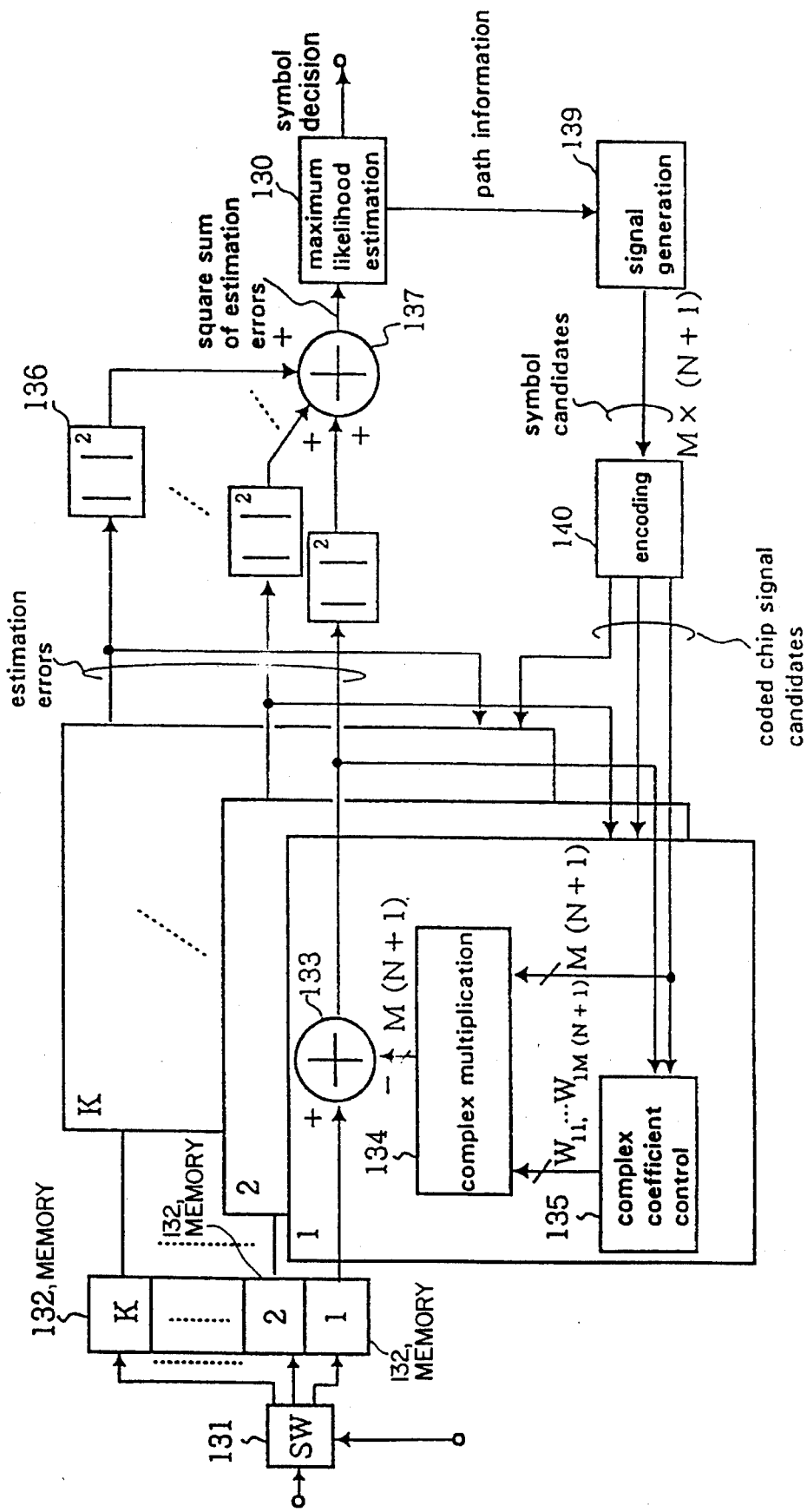
FIG. 28 is a block diagram showing an example of a nonlinear demodulator.

FIG. 28 is a block diagram showing an example of a nonlinear demodulator. This demodulator is used when the timing of interfering signals does not coincide with that of the desired signal: in other words, it is used in asynchronous conditions. Although its configuration is basically equivalent to that of the embodiment shown in FIG. 14, the decision method implemented by the maximum likelihood sequence estimator 130 differs from that of the maximum likelihood sequence estimator 138 shown in FIG. 14. Namely, when chips of different channels constituting an interference source hit against a given symbol, the maximum likelihood estimation carried out by this maximum likelihood sequence estimator 130 switches its channel impulse response estimate according to the positions of these chips.

Figure 29:
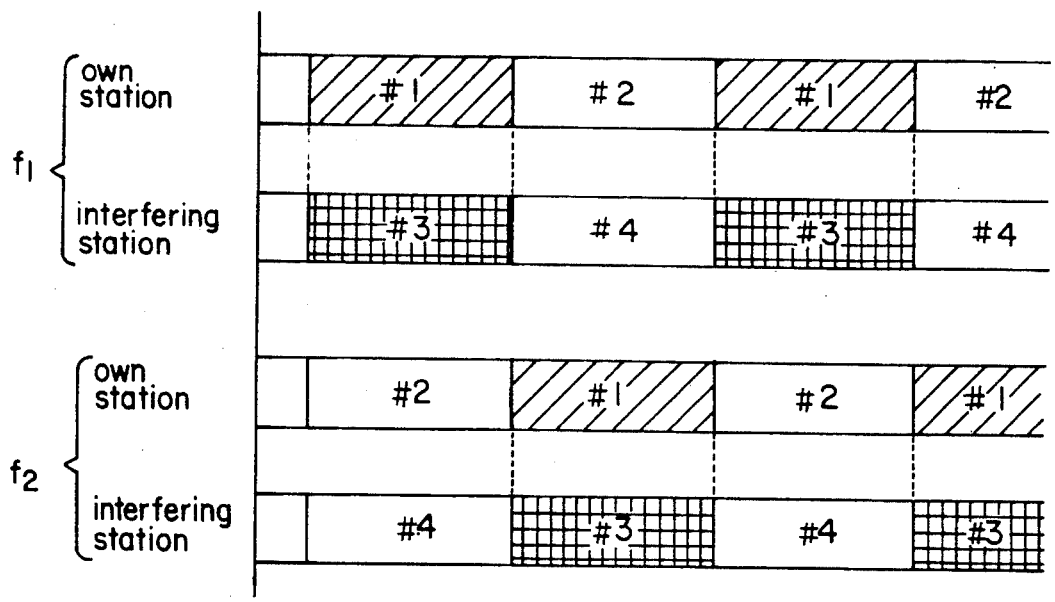
FIG. 29 shows signals when there is perfect synchronization between base stations in transmission to mobile stations.
Figure 30:
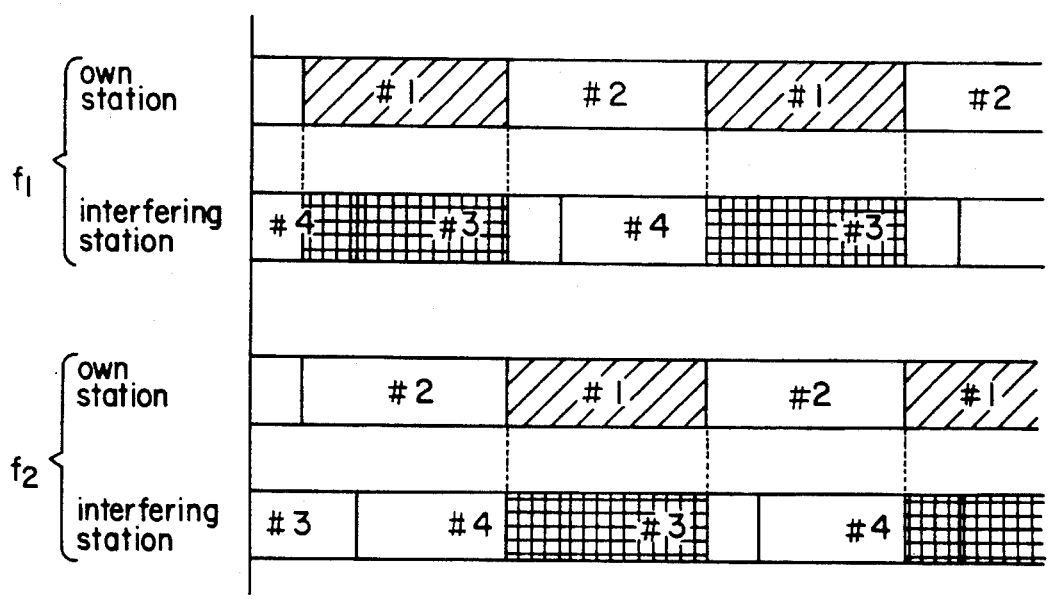
FIG. 30 shows signals when there is imperfect synchronization between base stations.

FIG. 29 shows the signals when there is perfect synchronization between the base stations in transmission to the mobile stations. FIG. 30 shows the signals when synchronization is imperfect. For the sake of simplicity, it will be assumed here that K=2 and that there is just one interfering station. The hopping frequencies are $f_1$ and $f_2$, and hopping channel groups #1 to #4 are multiplexed as previously described. The desired signal is contained in the hopping channel group #1.

As shown in FIG. 29, when synchronization between the base stations is perfect, hopping channel group #3 hits hopping channel group #1. Hopping channel group #3 may therefore be assumed to be the interferer. In an asynchronous situation, however, as shown in FIG. 30, part of hopping channel group #3 and part of hopping channel group #4 both hit hopping channel group #1. Suppose that, due to the asynchronous conditions, the proportion of hopping channel group #4 which hits has become larger than the proportion of hopping channel group #3 which hits. Under these circumstances, if a nonlinear demodulator of the sort shown in FIG. 14 is used to form replicas by estimating channel impulse response using, on the assumption of perfect synchronization, the training signal of hopping channel group #3, the channel impulse response estimate will be unsatisfactory and hence interference cancellation will deteriorate. Degradation of reception characteristics can therefore be anticipated.

Accordingly, in this embodiment, reception characteristics are improved by changing over the training signal used for estimating the channel impulse response of the interfering signal, this changeover being carried out in accordance with the proportions with which the hopping channel groups hit. For example, in a case such as that shown in FIG. 30, because the proportion of hopping channel group #3 which hits is the larger, channel impulse response estimation is carried out using the training signal of hopping channel group #3. On the other hand, if the proportion of #4 which hits exceed the proportion of #3 which hits, it is the training signal of #4 that is used. A decision regarding the hitting proportion may be performed as follows. The channel impulse response is estimated in the demodulator using the training signals of both #3 and #4 hopping channel groups, and the squares of the estimation errors obtained from the received signal and the replica formed in the receiver are compared in the training interval. The hopping channel giving the smaller error is judged to be the one with a greater hitting proportion.

However, if the training signal is changed over in accordance with the hit proportion, since two hopping channel groups will hit roughly the same in the vicinity of a hit proportion of 0.5, no matter which training signal is used, reception characteristics will be inferior to those obtained under perfect synchronization conditions.

Accordingly, in order to maintain good reception characteristics irrespective of the hit proportion, interference may be cancelled using a replica formed by combining the hitting interferers in accordance with their hit proportions. For example, under the conditions depicted in FIG. 30, coded chip signals would be formed by multiplying the signals of hopping channel groups #3 and #4 by the proportions with which these groups hit hopping channel group #1. A combined replica in which fluctuations in the transmission path of the interferer have been taken into account is then formed. In this case, although the increased number of symbol candidate patterns means that the computational load is higher than that with perfect synchronization, a fairly exact replica of the hitting interfering signals can be formed. Reception characteristics on a par with those obtained with perfect synchronization can therefore be achieved even in asynchronous conditions.

The hit proportion may be detected as follows. Replicas which combine the two hitting hopping channel groups in various proportions are formed in the training interval, and respective channel impulse response estimations are made using these replicas. The proportions at which the estimation error becomes smallest is decided, and in the subsequent data signal interval, replicas are formed on the basis of combination in these proportions. Given conditions of the sort depicted in FIG. 30, the proportions in which signals of hopping channel groups #3 and #4 hit hopping channel group #1 may be taken to be of 11 different types based on increments of 0.1, namely: (0.0, 1.0), (0.1, 0.9), (0.2, 0.8) , ..., (1.0, 0.0). A channel impulse response is then estimated in each training interval using the replicas formed on the basis of these 11 different proportions, the proportions at which the estimation error becomes smallest is decided, and in the subsequent data interval replicas are formed on the basis of combination in accordance with these proportions.

Another method for detecting the hit proportion would be to regard the hit proportion as a variable and to use, in the training interval, a least squares method to determine not just the channel impulse response but also the hit proportion. Given the conditions shown in FIG. 30, and taking the proportions of signals of hopping channel groups #3 and #4 which hit hopping channel group #1 as $\alpha_1$ and $\alpha_2$, respectively, $\alpha_1$ and $\alpha_2$ are determined so as to minimize the square of the estimation error obtained from the received signal and the replicas.

In cases where the hit proportion varies very little from burst to burst, the hit proportion detection explained above does not have to be carried out for each burst.

Figure 31:
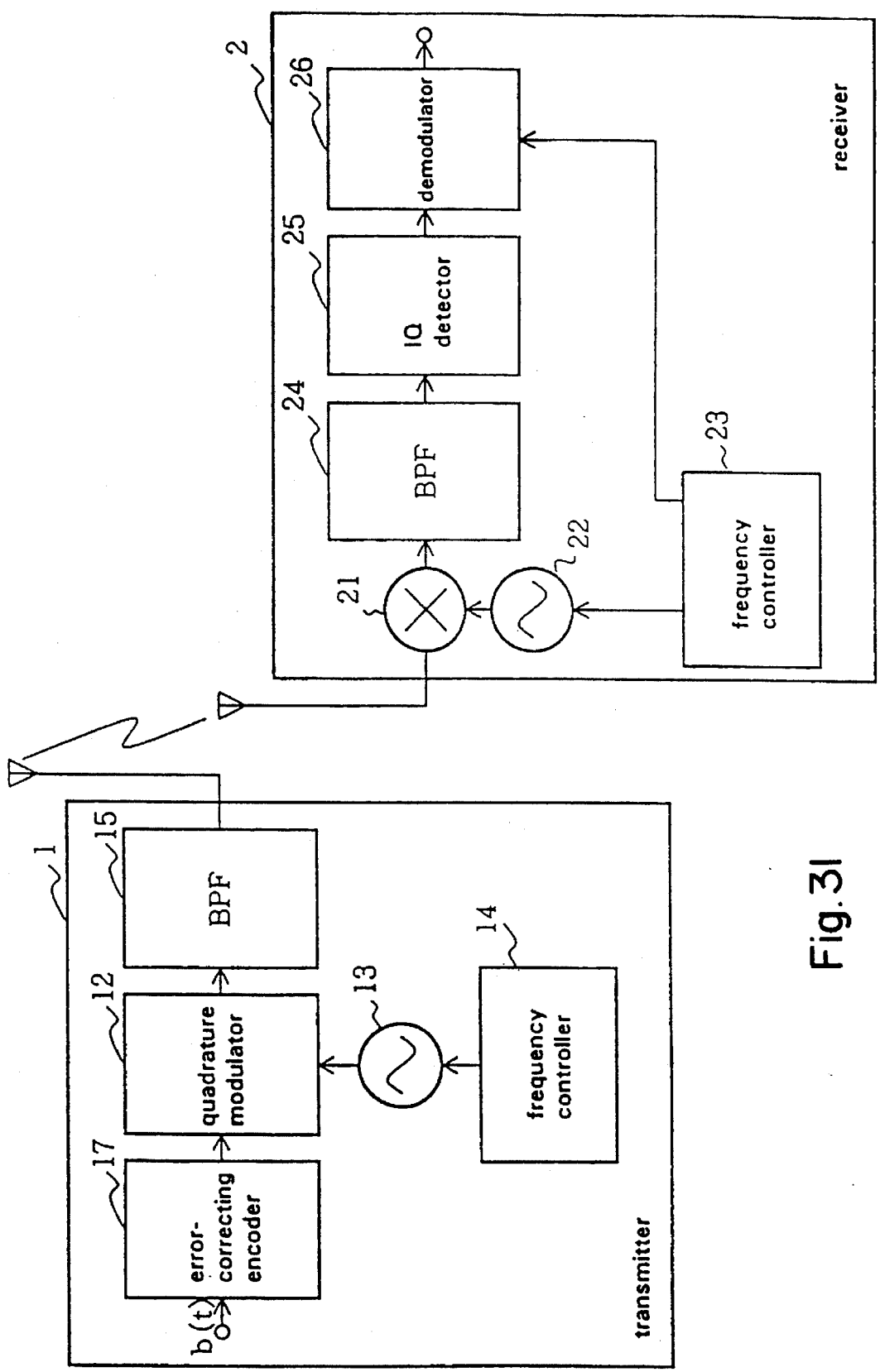
FIG. 31 is a block diagram showing another embodiment of this invention.

FIG. 31 is a block diagram showing another embodiment of the present invention. The distinguishing feature of this embodiment is that each symbol is not split into chips, and instead the symbol sequence is divided into blocks containing a predetermined number of symbols, encoding is carried out using an error-correcting code, and the code sequence thereby obtained is transmitted as a chip sequence. This embodiment is therefore significantly different from the first embodiment in that the transmitter 1 is provided with an error-correcting encoder 17 instead of an encoder 11.

Figure 32:
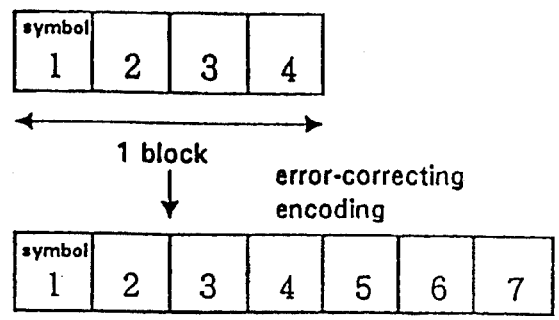
FIG. 32 shows a method for error-correcting encoding.
Figure 33:
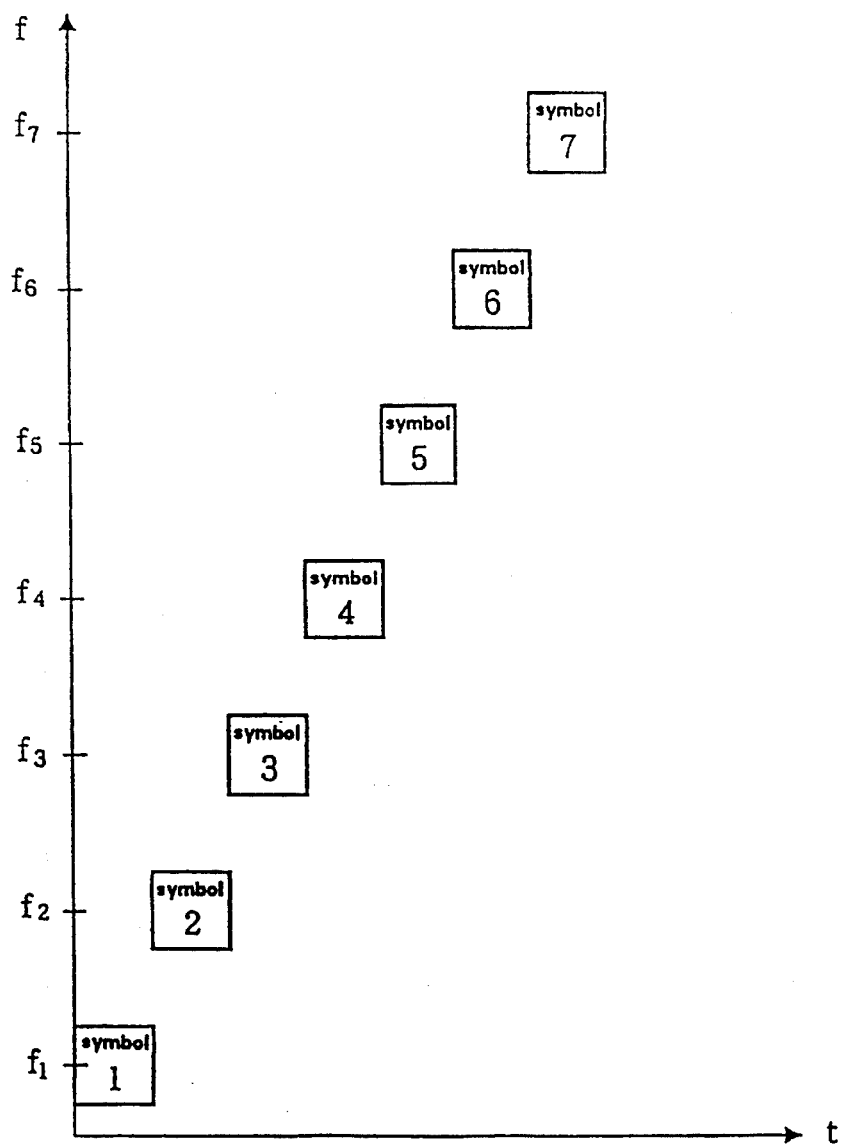
FIG. 33 shows a transmitted signal in the time-frequency domain.
Figure 34:
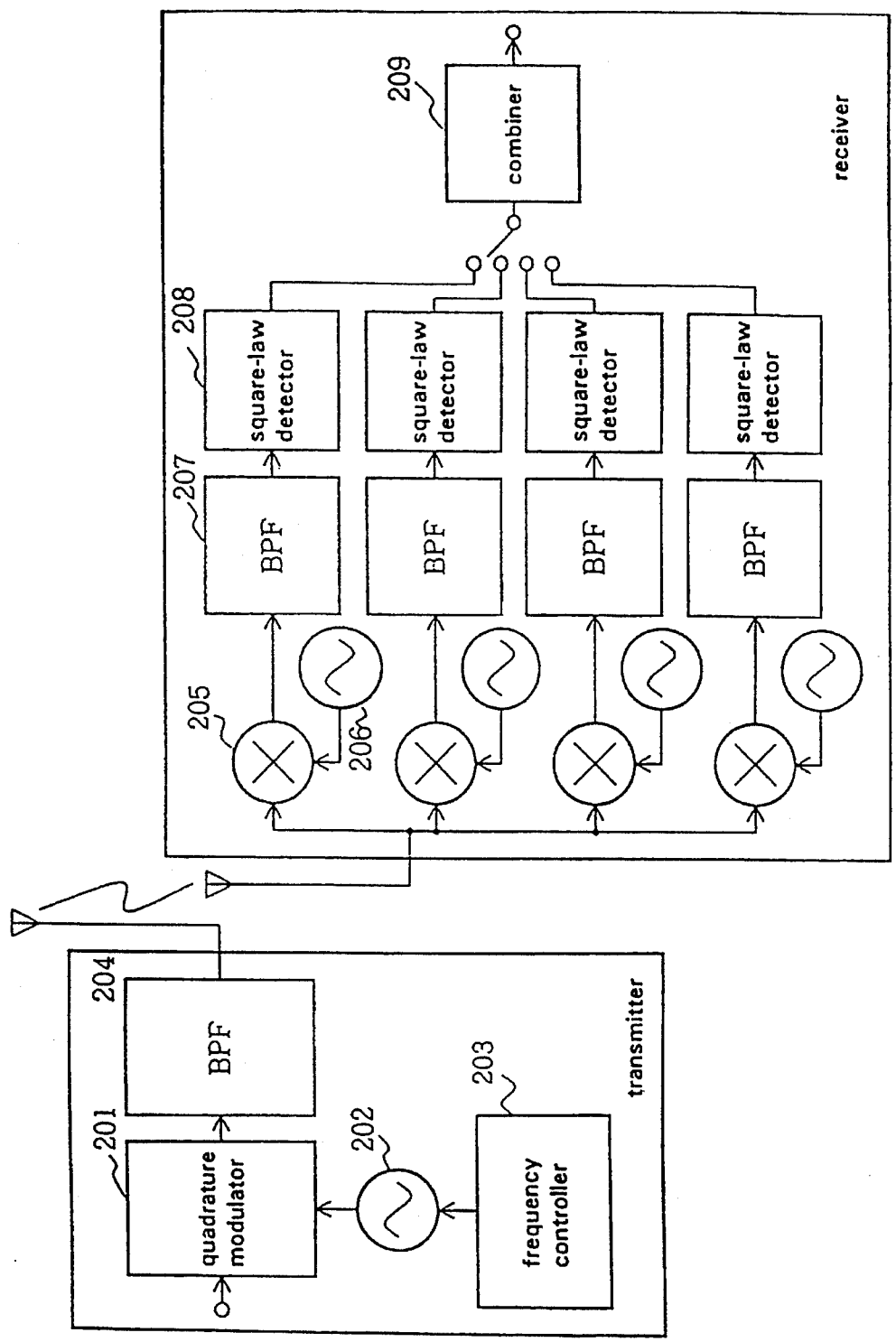
FIG. 34 is a block diagram showing an example of a conventional frequency diversity transmitter and receiver using fast frequency hopping.

The error-correcting encoder 17 forms blocks out of every four symbols in a burst, performs error-correcting encoding on each of these blocks, and then forms new blocks each comprising of a seven symbol signal. The quadrature modulator 12, the frequency synthesizer 13, and the frequency controller 14 carry out frequency hopping using similar methods to those explained in previous embodiments, but with each block being regarded as one symbol and each symbol in a block being regarded as one chip. Because a single block is encoded to a signal comprising seven symbols, hopping occurs using frequencies $f_1$ to $f_7$ in exactly the same way as it would when the number of chips K=7. The encoding method is shown in FIG. 32 and the transmitted signal is shown in FIG. 33 in the time-frequency domain.

Nonlinear demodulation is suitable for the demodulator 26 which demodulates the signal that has been encoded with an error-correcting code. When demodulation takes place, serial-to-parallel conversion is carried out with the symbols in each block being regarded as chips, in similar fashion to the transmitter side. Instead of symbol candidates, block candidates in which four symbols are taken as one block are obtained from these parallel signals, and coded chip signal candidates are formed by encoding these block candidates with the same error-correcting code as used on the transmitter side. Subsequent operations are equivalent to those of the nonlinear demodulation of the previous embodiments, with replicas being formed from the encoded chip signal candidates, estimation errors being obtained by comparison with the received signal, and the block candidate where the square sum becomes smallest being decided as the most likely. This block candidate is converted into symbols and becomes the symbol decision output. Channel impulse response fluctuation can also be estimated on the basis of the estimation error. The foregoing operations constitute the method whereby signals encoded by an error-correcting code are demodulated.

Although the invention has been described in detail with reference to the presently preferred embodiments, it should be understood by one of ordinary skill in the art that various modifications can be made without departing from the spirit and scope of the invention. Accordingly, it is not intended that the invention be limited, except as by the appended claims.

What is claimed is:

1. A frequency diversity communication system comprising:

a transmitter unit, comprising:

splitting means for splitting each symbol of an input symbol sequence into a plurality K of chips;

carrier frequency generating means for generating a plurality K of mutually differing frequencies as carrier frequencies, said carrier frequencies having a preset initial phase;

chip modulation means for modulating said chips with said carrier frequencies;

chip transmitting means for transmitting said modulated chips; and a first receiver unit receiving a signal transmitted from said transmitting unit, said first receiver unit comprising:

local frequency generating means for generating said plurality K of said mutually differing frequencies as local frequencies, each of said local frequencies being substantially in phase with an initial phase of a respective one of said carrier frequencies; and demodulation means for demodulating an input to said first receiver with said local frequencies.

2. A frequency diversity communication system according to claim 1, wherein said carrier frequency generating means and said local frequency generating means each include:

a look-up table in which a periodic waveform has been pre-recorded; and look-up table manipulation means for creating a frequency output from said look-up table by changing an addressing signal to said look-up table.

3. A frequency diversity communication system according to claim 1, wherein said transmitter further comprises chip encoding means for encoding said chips.

4. A frequency diversity communication system according to claim 1, further comprising means for outputting said modulated chips from said transmitter unit in a time series fashion.

5. A frequency diversity communication system according to claim 4, wherein:

said chip modulation means includes said plurality K of modulators which modulate said chips in parallel, each of said modulators using one of said mutually differing frequencies; and said transmitter unit further comprises:

i) a plurality K of bandpass filters which restrict a bandwidth of an output of each of said modulators; and ii) a combiner which combines an output of each of said bandpass filters in a time series fashion.

6. A frequency diversity communication system according to claim 4, wherein:

said carrier frequencies are formed separately and continuously; and said carrier frequency generating means includes selecting means for selecting said mutually differing frequencies in a time series manner.

7. A frequency diversity communication system according to claim 1, wherein said modulated chips are output from said transmitter simultaneously and in parallel.

8. A frequency diversity communication system according to claim 1, wherein said first receiver unit further comprises:

quasi-coherent detection means for extracting a plurality K of complex envelope signals from said received signal using an output of said local frequency generating means; and decision means for determining a transmitted symbol from said complex envelope signals, said decision means comprising:

i) multiplying means for multiplying said complex envelope signals by respective complex coefficients;

ii) combining means for combining said multiplied complex envelope signals and for determining said transmitted symbol; and iii) complex coefficient setting means for setting an initial value of said complex coefficients in accordance with said determined transmitted symbol, thereby training said complex coefficients with a predetermined pattern in accordance with said transmitted symbol.

9. A frequency diversity communication system in accordance with claim 1, wherein said first receiver unit further comprises:

quasi-coherent detection means for extracting a plurality K of complex envelope signals from said received signal using an output of said local frequency generating means; and decision means for determining transmitted symbols from said complex envelope signals, said decision means comprising:

i) receiving channel identification means for identifying a receiving channel using a first training signal having a predetermined pattern contained in said transmitted symbols wherein said predetermined pattern is based on said complex envelope signals received by said decision means; and ii) channel impulse response estimation means for estimating a channel impulse response of said receiving channel using one or more second training signals containing transmitted symbols in respective one or more interfering signals to determine said transmitted symbols from said complex envelope signals.

10. A frequency diversity communication system according to claim 9, wherein said decision means further comprises:

encoder means for encoding symbol candidates;

estimation means for obtaining an estimate of each of said complex envelope signals from an output of said encoder means;

estimation error means for obtaining an estimation error by subtracting said estimate from said complex envelope signals;

squaring means for obtaining square sums of an output of said estimation error means;

maximum likelihood sequence estimator means for determining a transmitted symbol by selecting a path from among said plurality K of paths for which an output of said squaring means is minimum; and a signal generator which provides said symbol candidates to staid encoder means in correspondence with said selected path.

11. A frequency diversity communication system in accordance with claim 1, wherein:

said transmitter unit further comprises:
  i) transmitter multiplying means for multiplying each of said plurality K of said chips by signals which are mutually orthogonal; and
  ii) multiplexing means for multiplexing an output of said transmitter multiplying means; and said first receiver unit further comprises receiver multiplying means for multiplying said received signal by complex conjugates of said orthogonal signals.

12. A frequency diversity communication system according to claim 7, wherein a temporal length $T_c$ of each of said modulated chips is $1/K$ of a temporal length $T_s$ of said symbol.

13. A frequency diversity communication system according to claim 7, wherein a temporal length $T_c$ of said modulated chips is equal to or shorter than said temporal length $T_s$ of said symbol and longer than $1/K$ of said temporal length $T_s$ of said symbol.

14. A frequency diversity communication system according to claim 1, further comprising a second receiver unit.

15. A frequency diversity communication system according to claim 1, wherein said transmitter further comprises:

chip arranging means for arranging said plurality of K of said modulated chips into a plurality of arranged chip bursts wherein said chip bursts are arranged by grouping said chips by frequency; and said chip transmitting means transmitting said plurality of arranged chip bursts.

16. A frequency diversity communication system according to claim 15, wherein said chip arranging means groups said chips together by chips which use a same frequency of said mutually differing frequencies.

17. A frequency diversity communication system according to claim 16, wherein said chip transmitting means transmits said plurality of arranged chip bursts in parallel and at differing ones of said carrier frequencies.

18. A frequency diversity communication system according to claim 9, wherein said channel impulse response estimation means includes channel switching means for switching between said first training signal and said second training signal.

19. A frequency diversity communication system according to claim 9, wherein said channel impulse response estimation means includes channel combining means for combining a channel impulse response estimation from said first training signal and said second training signal.

20. A frequency diversity communication system in accordance with claim 1, wherein said frequency diversity communication system is a cellular mobile radio system.

21. A frequency diversity communication system according to claim 1, wherein said frequency diversity communication system comprises a plurality of said first receiver units receiving said signal transmitted from said transmitting unit.

22. A frequency diversity communication system according to claim 1, wherein said first receiver unit further comprises an interference canceller to cancel interferences from a same one of said carrier frequencies received from a different transmitter unit.

23. A frequency diversity communication system according to claim 1, wherein said first receiver unit further comprises an interference canceller to cancel interferences from a same one of said carrier frequencies received from a different transmitter unit.

24. A frequency diversity communication system comprising:

a transmitter unit, comprising:
  symbol blocking means for dividing an input symbol sequence into blocks of symbols, each of said blocks of symbols containing a predetermined number of symbols;
  carrier frequency generating means for generating a plurality K of mutually differing frequencies as carrier frequencies, each of said carrier frequencies having a preset initial phase; and
  block modulation means for modulating said blocks of symbols with said carrier frequencies; and a first receiver unit receiving a signal transmitted from said transmitting unit, said first receiver unit comprising:
  local frequency generating means for generating said plurality K of said mutually differing frequencies as local frequencies, said local frequencies being substantially in phase with an initial phase of a respective one of said carrier frequencies; and
  demodulation means for demodulating an input to said first receiver with said local frequencies.

25. A frequency diversity communication system in accordance with claim 24, wherein said transmitter unit further comprises:

error-correction encoding means for performing an error-correction encoding to said blocks of symbols; and block sequence transmission means for transmitting a sequence of said modulated blocks of symbols.

26. A frequency diversity communication system according to claim 24, wherein said frequency diversity communication system comprises a plurality of said first receiver units receiving said signal transmitted from said transmitting unit.

27. A frequency diversity transmitter unit, comprising:

splitting means for splitting each symbol of an input symbol sequence into a plurality K of chips;

carrier frequency generating means for generating a plurality K of mutually differing frequencies as carrier frequencies, said carrier frequencies having a preset initial phase; and chip modulation means for modulating said chips with said carrier frequencies.

28. A frequency diversity transmitter unit according to claim 27, further comprising:

transmitter multiplying means for multiplying each of said plurality K of said chips by signals which are mutually orthogonal; and multiplexing means for multiplexing an output of said transmitter multiplying means.

29. A frequency diversity receiver unit for receiving signals comprising:

local frequency generating means for generating a plurality K of mutually differing frequencies as local frequencies, each of said local frequencies being substantially in phase with an initial phase of a respective one of carrier frequencies;

demodulation means for demodulating an input to said receiver with said local frequencies;

combining means responsive to said demodulation means for combining a plurality K of chips into an individual symbol of an input symbol sequence;

quasi-coherent detection means for extracting a plurality K of complex envelope signals from said received signal using an output of said local frequency generating means; and decision means for determining a transmitted symbol from said complex envelope signals.

30. A frequency diversity receiver unit according to claim 29, wherein said decision means comprises:

multiplying means for multiplying said complex envelope signals by respective complex coefficients;

combining means for combining said multiplied complex envelope signals and for determining said transmitted symbol; and complex coefficient setting means for setting an initial value of said complex coefficients in accordance with said determined transmitted symbol, thereby training said complex coefficients with a predetermined pattern in accordance with said transmitted symbol.

31. A frequency diversity communication system according to claim 29 wherein said decision means comprises:

receiving channel identification means for identifying a receiving channel using a first training signal having a predetermined pattern contained in said transmitted symbols wherein said predetermined pattern is based on said complex envelope signals received by said decision means; and channel impulse response estimation means for estimating a channel impulse response of said receiving channel using one or more second training signals containing transmitted symbols in respective one or more interfering signals to determine said transmitted symbols from said complex envelope signals.

* * * * *